(12) United States Patent
Da Cruz et al.

(10) Patent No.: US 12,507,985 B2
(45) Date of Patent: Dec. 30, 2025

(54) METHODS AND SYSTEMS FOR ULTRASOUND-ASSISTED ENDOSCOPY

(71) Applicant: GE Precision Healthcare LLC, Waukesha, WI (US)

(72) Inventors: Edouard Da Cruz, Alpes-Maritimes (FR); Giandonato Stallone, Alpes-Maritimes (FR)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 138 days.

(21) Appl. No.: 18/461,440

(22) Filed: Sep. 5, 2023

(65) Prior Publication Data

US 2024/0074728 A1 Mar. 7, 2024

Related U.S. Application Data

(60) Provisional application No. 63/374,716, filed on Sep. 6, 2022.

(51) Int. Cl.
| | | |
|---|---|---|
| *A61B 8/12* | (2006.01) | |
| *A61B 1/00* | (2006.01) | |
| *A61B 1/04* | (2006.01) | |
| *A61B 1/303* | (2006.01) | |
| *A61B 8/00* | (2006.01) | |

(52) U.S. Cl.
CPC ............ *A61B 8/12* (2013.01); *A61B 1/00103* (2013.01); *A61B 1/0014* (2013.01); *A61B 1/00144* (2013.01); *A61B 1/04* (2013.01); *A61B 1/303* (2013.01); *A61B 8/4416* (2013.01); *A61B 8/445* (2013.01)

(58) Field of Classification Search
CPC ....... A61B 8/12; A61B 8/4411; A61B 8/4422; A61B 8/445; A61B 1/0014; A61B 1/00135; A61B 1/00137
See application file for complete search history.

(56) References Cited

U.S. PATENT DOCUMENTS

| | | | | |
|---|---|---|---|---|
| 4,742,829 | A * | 5/1988 | Law ..................... | A61B 8/0866 |
| | | | | 600/464 |
| 5,671,747 | A * | 9/1997 | Connor ................ | A61B 8/4455 |
| | | | | 600/459 |
| 6,884,219 | B1 * | 4/2005 | Pruter ..................... | A61B 8/12 |
| | | | | 600/459 |
| 7,520,856 | B2 * | 4/2009 | Vaezy ................... | A61B 8/462 |
| | | | | 601/3 |
| 2006/0281970 | A1 * | 12/2006 | Stokes ............... | A61B 1/00133 |
| | | | | 600/104 |

(Continued)

FOREIGN PATENT DOCUMENTS

| | | | | | |
|---|---|---|---|---|---|
| KR | | 2023164835 A | * | 12/2023 | ............... A61B 1/00 |
| WO | WO-2023031813 A1 | * | 3/2023 | ........... A61B 1/0014 |

*Primary Examiner* — Colin T. Sakamoto
(74) *Attorney, Agent, or Firm* — McCoy Russell LLP

(57) ABSTRACT

Various methods and systems are provided for ultrasound-assisted endoscopy. An ultrasound-assisted endoscopy system may include a selectively positioned bracket with an opening for receiving an endoscope and an array of transducer elements of an ultrasound probe that are aligned with a longitudinal axis of the endoscope. The ultrasound probe may be coupled to the endoscope by the selectively positioned bracket, which may be configured to acquire an image along the longitudinal axis.

15 Claims, 14 Drawing Sheets

(56) References Cited

U.S. PATENT DOCUMENTS

| | | | |
|---|---|---|---|
| 2007/0299437 A1* | 12/2007 | Podmore | A61B 1/0014 |
| | | | 606/41 |
| 2008/0064962 A1* | 3/2008 | Oonuki | A61B 90/11 |
| | | | 600/461 |
| 2008/0167524 A1* | 7/2008 | Goldwasser | A61B 1/31 |
| | | | 600/115 |
| 2008/0287916 A1* | 11/2008 | Agmon | A61B 5/14546 |
| | | | 604/523 |
| 2009/0156996 A1* | 6/2009 | Milsom | A61B 1/31 |
| | | | 606/232 |
| 2014/0276081 A1* | 9/2014 | Tegels | A61B 8/4209 |
| | | | 600/461 |
| 2014/0296848 A1* | 10/2014 | Chang | A61B 1/0014 |
| | | | 606/41 |
| 2016/0157703 A1* | 6/2016 | Brooks | A61B 17/1285 |
| | | | 600/104 |
| 2016/0278738 A1* | 9/2016 | Buchalter | A61B 8/4422 |
| 2017/0112523 A1* | 4/2017 | Jagelski | A61B 18/1492 |
| 2017/0231474 A1* | 8/2017 | Saadat | A61B 1/0625 |
| | | | 600/107 |
| 2017/0340308 A1* | 11/2017 | Cermak | A61B 8/12 |
| 2018/0098821 A1* | 4/2018 | Saul | A61B 8/4411 |
| 2018/0338676 A1* | 11/2018 | Krimsky | A61B 1/0014 |
| 2019/0357883 A1* | 11/2019 | Steinberg | A61B 10/04 |
| 2020/0275975 A1* | 9/2020 | Chen | A61B 18/1492 |
| 2021/0204910 A1* | 7/2021 | Begg | A61B 8/0841 |
| 2022/0354457 A1* | 11/2022 | Manian | A61B 8/12 |
| 2022/0401071 A1* | 12/2022 | Prior | A61B 1/00154 |
| 2024/0237967 A1* | 7/2024 | Steinberg | A61B 8/08 |

* cited by examiner

METHODS AND SYSTEMS FOR ULTRASOUND-ASSISTED ENDOSCOPY

CROSS REFERENCE TO RELATED APPLICATIONS

The present application claims priority to U.S. Provisional Application No. 63/374,716 entitled "METHODS AND SYSTEMS FOR ULTRASOUND-ASSISTED ENDOSCOPY", filed on Sep. 6, 2022. The entire contents of the above identified application is hereby incorporated by reference for all purposes.

FIELD

Embodiments of the subject matter disclosed herein relate to systems and methods for ultrasound-assisted endoscopy.

BACKGROUND

Medical ultrasound is an imaging modality that employs ultrasound waves to probe the internal structures of a body of a patient and produce a corresponding image. For example, an ultrasound probe comprising a plurality of transducer elements emits ultrasonic pulses which reflect, echo, refract, or are absorbed by structures in the body. The ultrasound probe then receives reflected echoes, which are processed into an image.

The ultrasound probe may be used in combination with other devices to provide image-based diagnostics during a medical procedure. For example, an ultrasound probe may be coupled to an endoscope to generate high resolution images of surrounding tissues in real-time, in addition to images acquired by a camera, during an endoscopic examination. Endoscopes may also be used for interventional procedures including biopsies or removal of a polyp or foreign body. Specifically, a transvaginal ultrasound probe may be coupled with a hysteroscope to produce ultrasound images of a patient's uterine wall during a hysteroscopic procedure to assist in evaluating uterine health.

BRIEF DESCRIPTION

In one embodiment, a medical imaging assembly comprises a bracket with an opening configured to receive a device and an array of transducer elements of an ultrasound probe, the array of transducer elements aligned with a longitudinal axis of the device. The ultrasound probe may be coupled to the device by the bracket and configured to acquire an image along the longitudinal axis. Furthermore, the array of transducer elements may provide a field of view of at least 50 degrees. In this way, the bracket may removably couple the array of transducer elements to a medical device in order to provide images during a procedure, allowing the array of transducer elements to be removed from the medical device after the procedure. Further, the bracket may include modular components allowing for the bracket to be applied to a plurality of medical devices.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

An ultrasound probe coupled to an invasive medical device (e.g., a medical device configured to be inserted into a subject) may be used to obtain internal ultrasound images of the subject, therefore requiring sterilization if the ultrasound probe is to be reused. However, current ultrasound probes may be incompatible with hospital sterilization procedures. Instead, it may be more cost effective to use a disposable ultrasound probe configured for reuse up to a threshold number of times. Herein, "disposable" may describe a device configured for a single use (e.g., a threshold is equal to 1) or a device that may be configured to be used and sterilized up to a threshold number of times before disposal, the threshold number of times being less than a number times a reusable device is used and sterilized before disposal. For example, the threshold number of times may be 10 times. In another example, the threshold number of times may be between 2 and 3. Alternatively, a disposable protective barrier may cover a reusable ultrasound probe. The disposable protective barrier may completely cover the reusable ultrasound probe in such a way that sterilization in between procedures may not be needed.

In one example, the medical device used with the ultrasound probe may be an endoscope which may call for sterilization prior to reuse or may instead be configured to be disposable. To account for all applications, it may be desirable to removably couple, e.g., couple such that the ultrasound probe can be readily detached from the endoscope by an operator without relying on tools or causing degradation of the medical device, the ultrasound probe to the endoscope. In this way, the ultrasound probe may be disposed of independent of the endoscope. Additionally, it may be desirable for the ultrasound probe to couple to a plurality of different endoscope types. For this reason, a bracket for removably coupling the ultrasound probe may include a modular component that may be selected based on the type of endoscope being used.

Thus, embodiments are provided herein for a disposable ultrasound assembly including a disposable ultrasound probe removably coupled to an endoscope by a coupling bracket. The coupling bracket may include a modular component allowing for compatibility between the coupling bracket and a range of endoscope tip diameters. The disposable ultrasound assembly may include a first connecting cable. The first connecting cable may connect to a second connecting cable which may remain external to a patient during a procedure and as such the second connecting cable may be reused for subsequent procedures.

Figure 1:
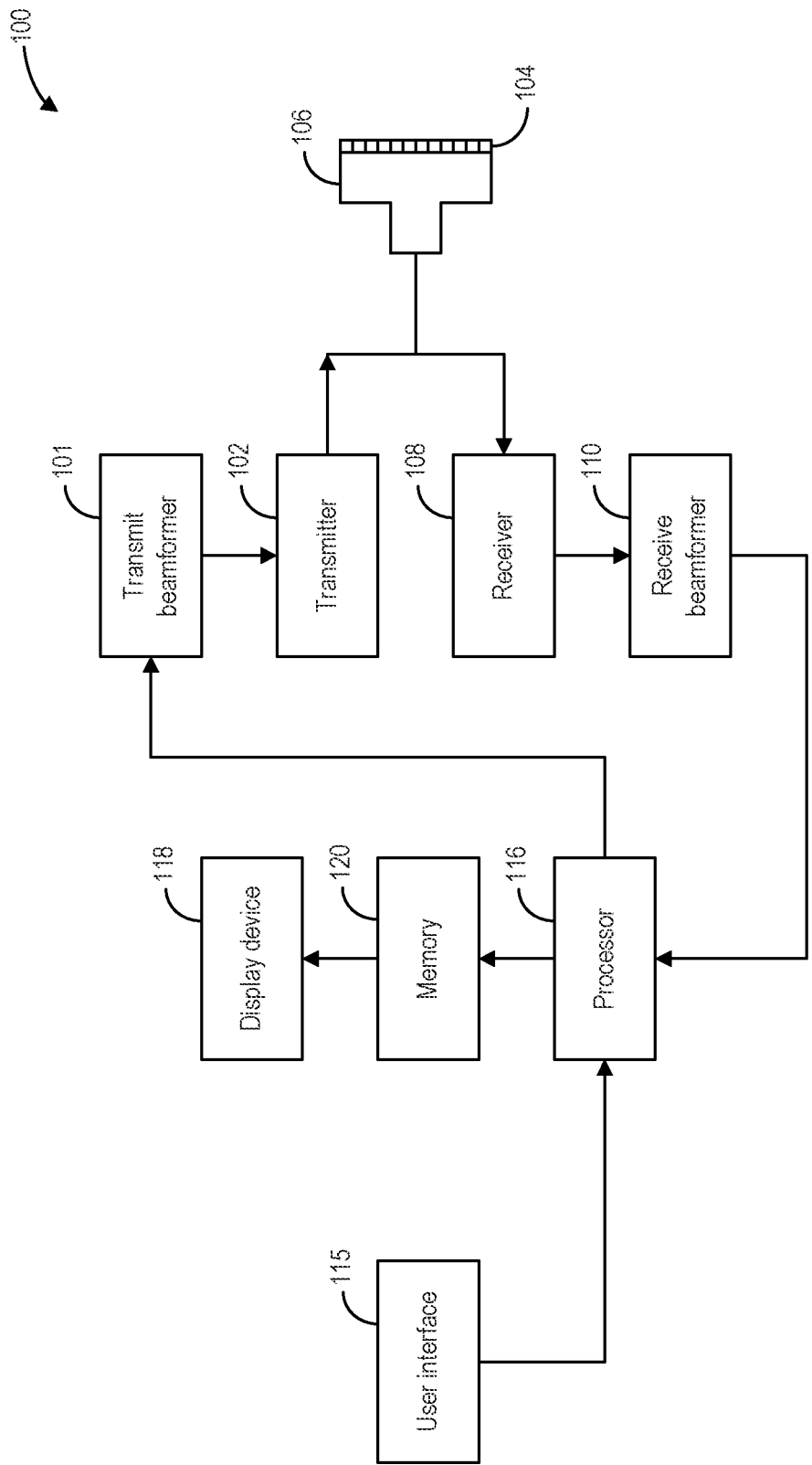
FIG. 1 shows a schematic diagram of an ultrasound imaging system.
Figure 2A:
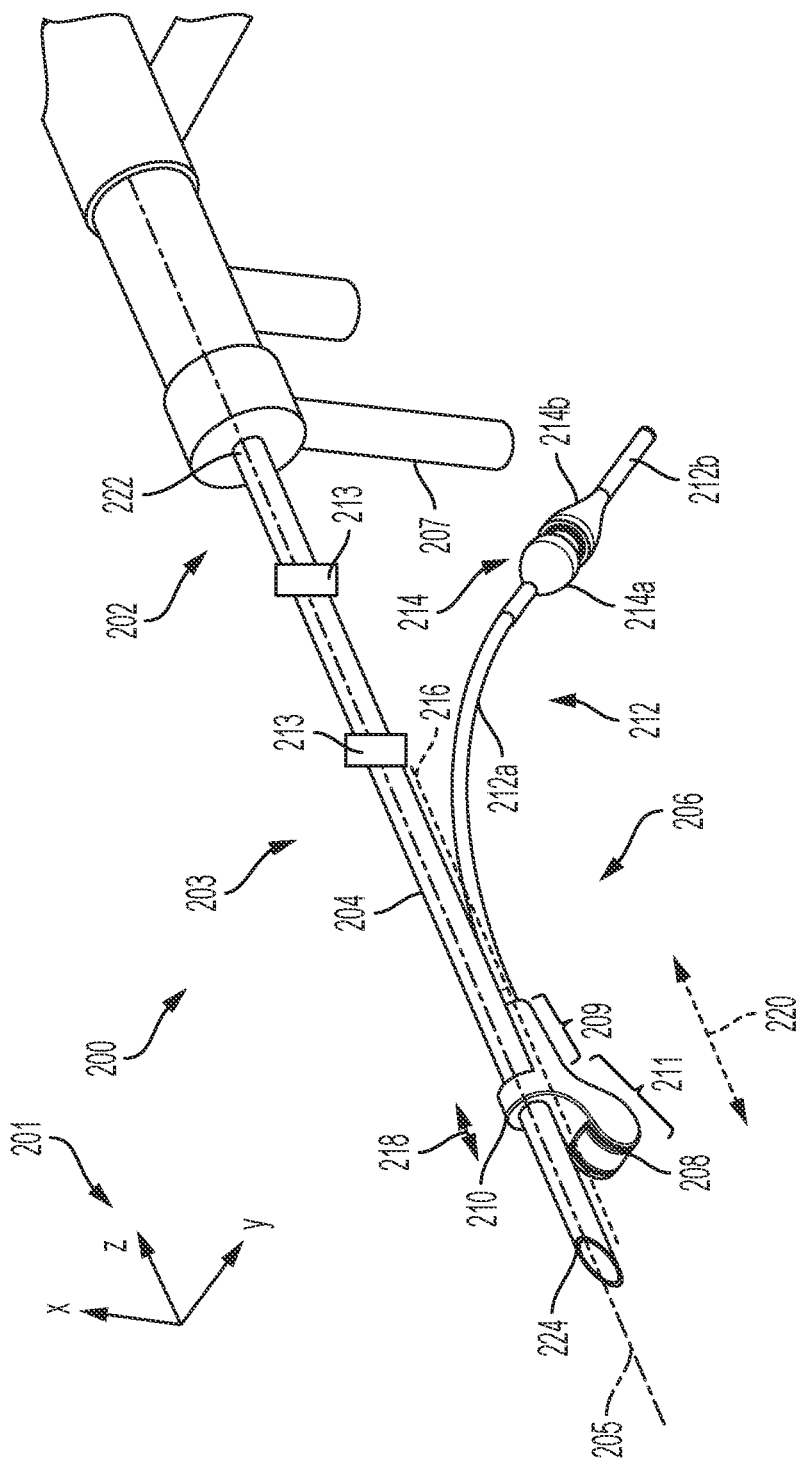
FIG. 2A shows an example of a disposable ultrasound assembly coupled to an endoscope, according to an embodiment of the present disclosure.
Figure 2B:
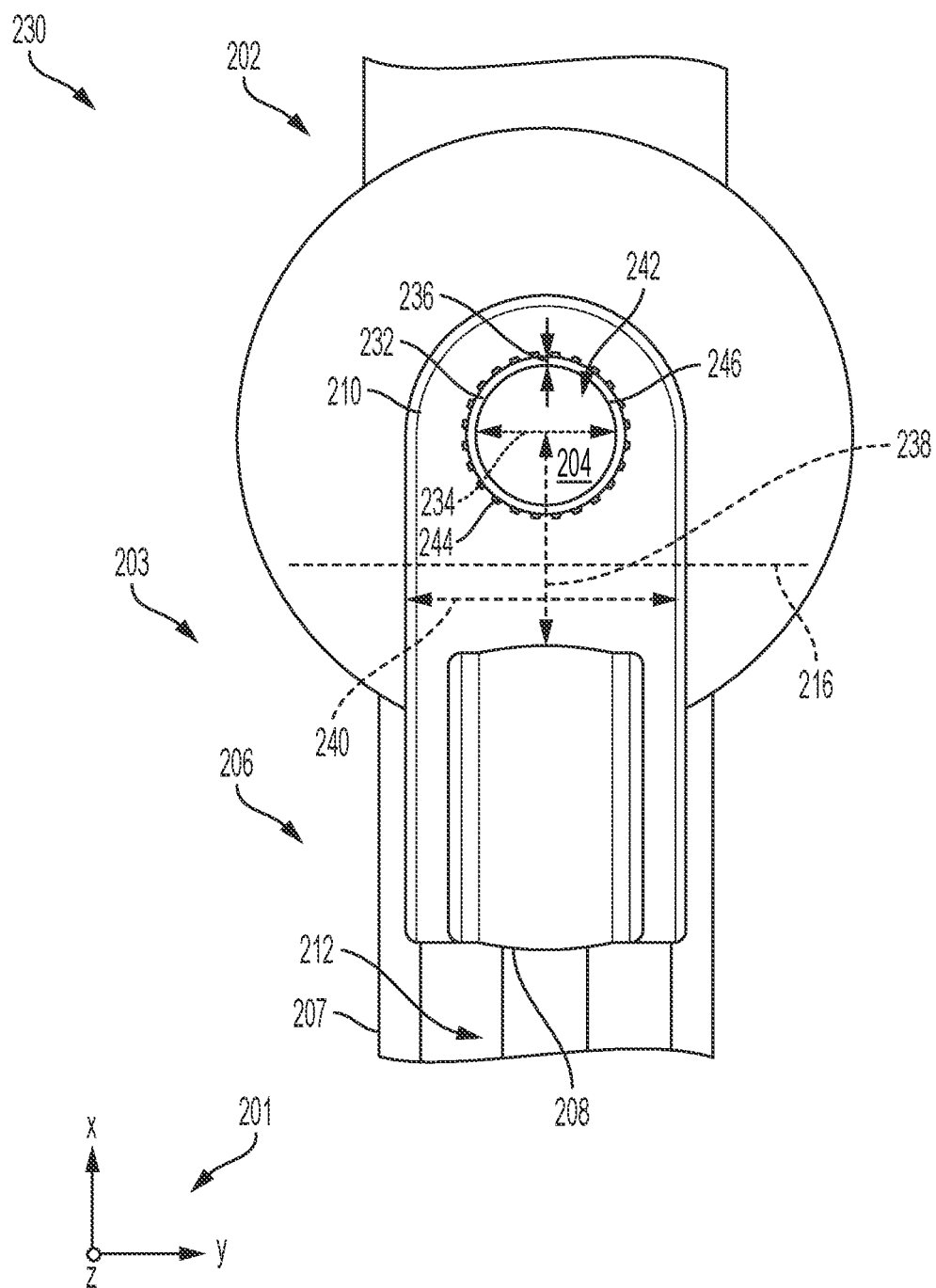
FIG. 2B shows a first alternate view of the disposable ultrasound assembly and endoscope of FIG. 2A.
Figure 2C:
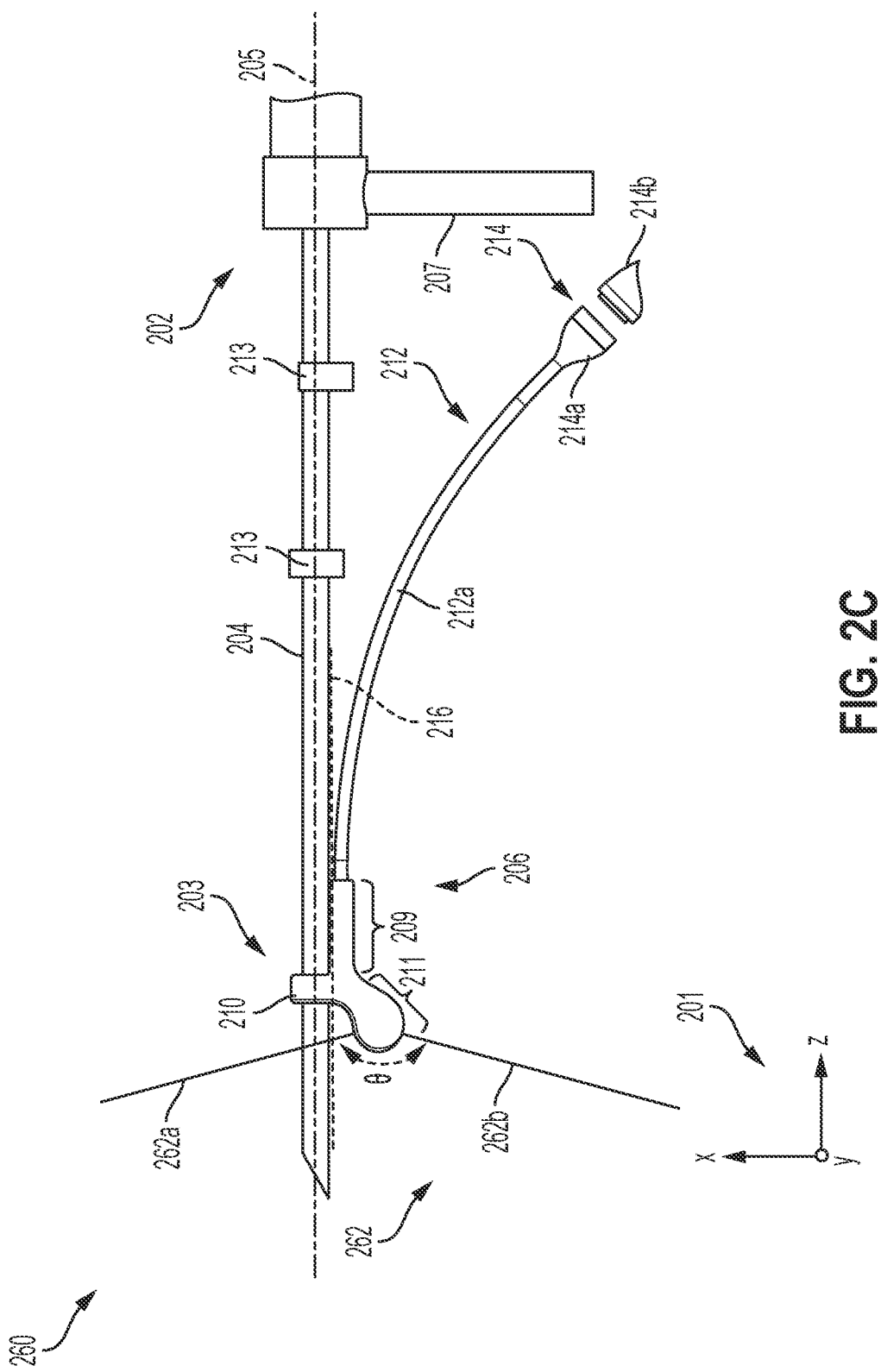
FIG. 2C shows a second alternate view of the disposable ultrasound assembly and endoscope of FIG. 2A.
Figure 3:
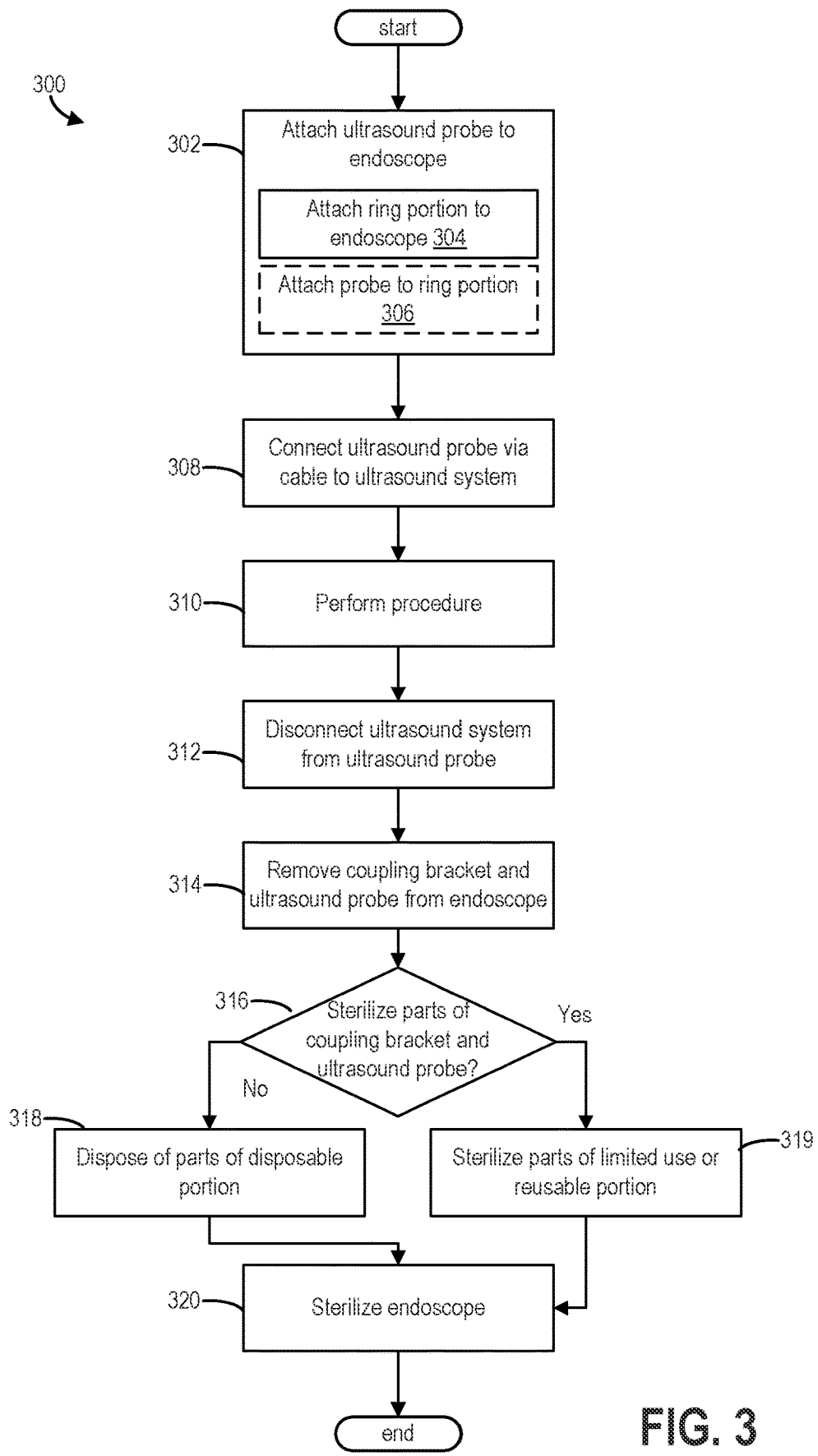
FIG. 3 shows a flow chart of an example of a method for using a disposable ultrasound probe.
Figure 7:
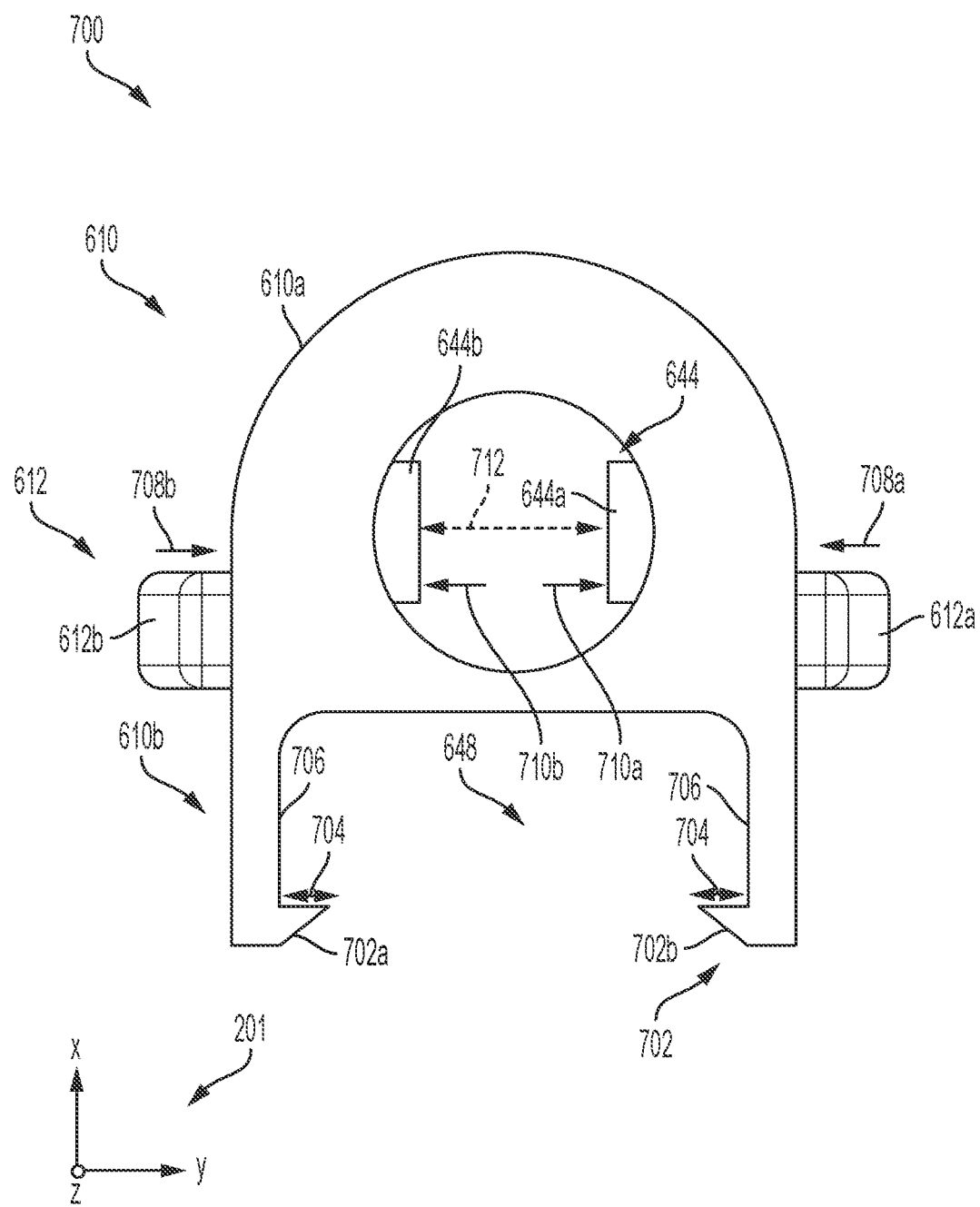
FIG. 7 shows an example of an alternate embodiment of the coupling bracket.
Figure 8:
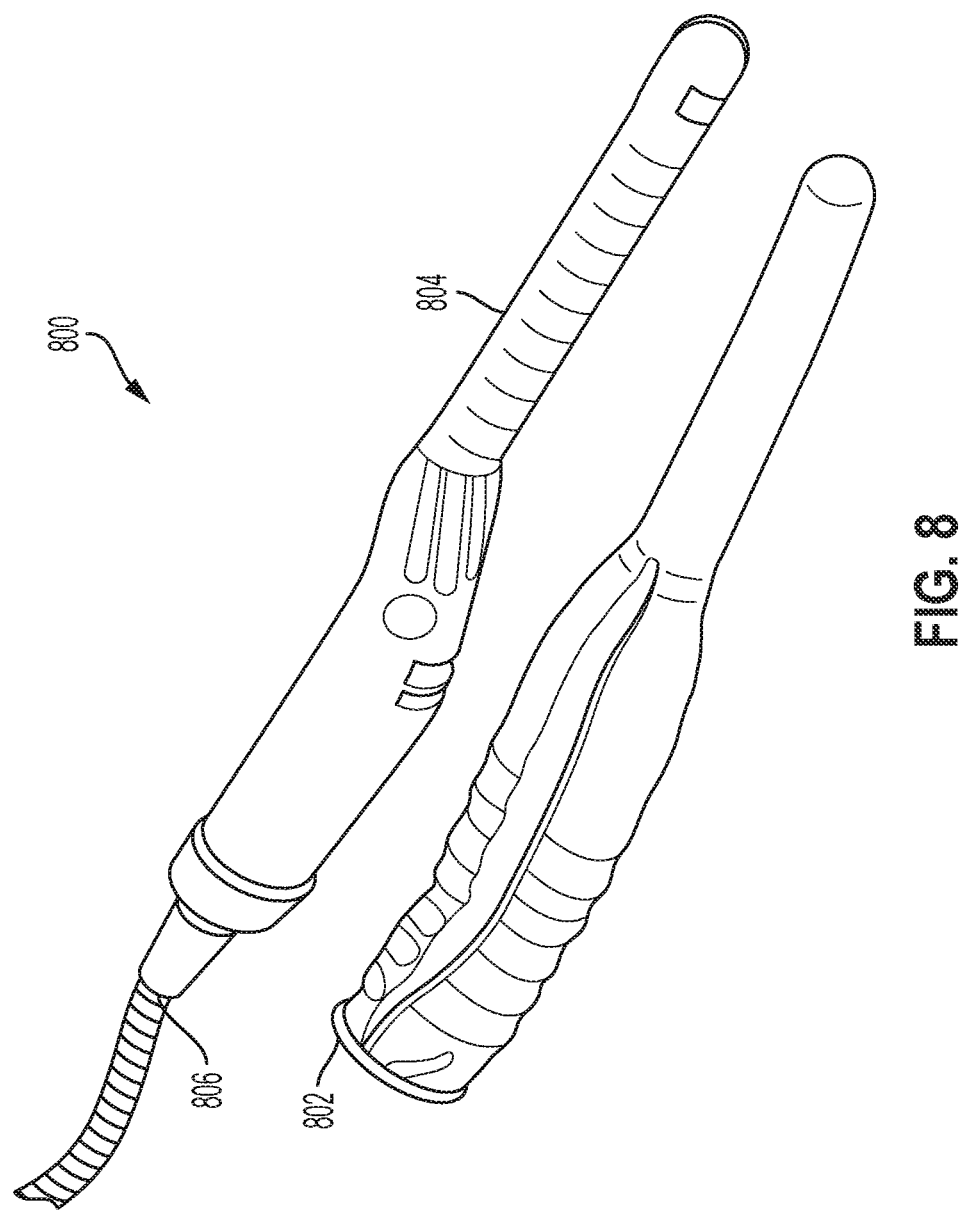
FIG. 8 shows an example of a reusable ultrasound probe and a protective sheath.

An example ultrasound system including an ultrasound probe is shown in FIG. 1. The ultrasound probe may be removably coupled to a device such as an endoscope, as shown in FIGS. 2A-C where removably coupled components may be separated without degrading either component. A coupling bracket may be a component which may be removably coupled to both the endoscope and the ultrasound probe. A first and a second alternate embodiment of the coupling bracket coupling the ultrasound probe to the endoscope is shown in FIGS. 4A-4C and FIGS. 6A-6C, respectively. The first and second alternate embodiments of the coupling bracket, independent of the ultrasound probe and endoscope are shown in FIG. 5 and FIG. 7, respectively. In one embodiment, the coupling bracket may be disposable while the ultrasound probe may be shielded from direct contact with a patient by a protective sheath. An example of a reusable ultrasound probe and protective sheath is shown in FIG. 8. The ultrasound probe removably coupled to the endoscope may form an internal imaging system which may be used during an endoscopic procedure. An example method for using the internal imaging system during an endoscopic procedure is shown in FIG. 3.

Referring to FIG. 1, a schematic diagram of an ultrasound imaging system 100 in accordance with an embodiment of the disclosure is shown. The ultrasound imaging system 100 includes a transmit beamformer 101 and a transmitter 102 that drives elements (e.g., transducer elements) 104 within a transducer array, herein referred to as probe 106, to emit pulsed ultrasonic signals (referred to herein as transmit pulses) into a body (not shown). According to an embodiment, the probe 106 may be a one-dimensional transducer array probe. However, in some embodiments, the probe 106 may be a two-dimensional matrix transducer array probe. In some embodiments, probe 106 may be a disposable probe removably coupled to an endoscope. As explained further below, the transducer elements 104 may be formed of a piezoelectric material. When a voltage is applied to a piezoelectric crystal, the crystal physically expands and contracts, emitting an ultrasonic spherical wave. In this way, transducer elements 104 may convert electronic transmit signals into acoustic transmit beams.

After the elements 104 of the probe 106 emit pulsed ultrasonic signals into a body (of a patient), the pulsed ultrasonic signals are back-scattered from structures within an interior of the body, like blood cells or muscular tissue, to produce echoes that return to the elements 104. The echoes are converted into electrical signals, or ultrasound data, by the elements 104 and the electrical signals are received by a receiver 108. The electrical signals representing the received echoes are passed through a receive beamformer 110 that outputs ultrasound data. Additionally, transducer element 104 may produce one or more ultrasonic pulses to form one or more transmit beams in accordance with the received echoes.

According to some embodiments, the probe 106 may contain electronic circuitry to do all or part of the transmit beamforming and/or the receive beamforming. For example, all or part of the transmit beamformer 101, the transmitter 102, the receiver 108, and the receive beamformer 110 may be situated within the probe 106. In one embodiment, the transmit beamformer 101, the transmitter 102, the receiver 108 and the receive beamformer 110 may be situated outside of the probe 106 and communicatively coupled via a cable. The terms "scan" or "scanning" may also be used in this disclosure to refer to acquiring data through the process of transmitting and receiving ultrasonic signals. The term "data" may be used in this disclosure to refer to either one or more datasets acquired with an ultrasound imaging system. In one embodiment, data acquired via ultrasound imaging system 100 may be used to train a machine learning model. A user interface 115 may be used to control operation of the ultrasound imaging system 100, including to control the input of patient data (e.g., patient medical history), to change a scanning or display parameter, to initiate a probe repolarization sequence, and the like. The user interface 115 may include one or more of the following: a rotary element, a mouse, a keyboard, a trackball, hard keys linked to specific actions, soft keys that may be configured to control different functions, and a graphical user interface displayed on a display device 118.

The ultrasound imaging system 100 also includes a processor 116 to control the transmit beamformer 101, the transmitter 102, the receiver 108, and the receive beamformer 110. The processor 116 is in electronic communication (e.g., communicatively connected) with the probe 106. For purposes of this disclosure, the term "electronic communication" may be defined to include both wired and wireless communications. The processor 116 may control the probe 106 to acquire data according to instructions stored on a memory of the processor, and/or memory 120. The processor 116 controls which of the elements 104 are active and the shape of a beam emitted from the probe 106. The processor 116 is also in electronic communication with the display device 118, and the processor 116 may process the data (e.g., ultrasound data) into images for display on the display device 118. The processor 116 may include a central processor (CPU), according to an embodiment.

According to other embodiments, the processor 116 may include other electronic components capable of carrying out processing functions, such as a digital signal processor, a field-programmable gate array (FPGA), or a graphic board. Furthermore, in some examples, the processor 116 may include multiple electronic components capable of carrying out processing functions. For example, the processor 116 may include two or more electronic components selected from a list of electronic components including: a central processor, a digital signal processor, a field-programmable gate array, and a graphic board.

According to another embodiment, the processor 116 may also include a complex demodulator (not shown) that demodulates the RF data and generates raw data. In another embodiment, the demodulation can be carried out earlier in the processing chain. The processor 116 is adapted to perform one or more processing operations according to a plurality of selectable ultrasound modalities on the data. In one example, the data may be processed in real-time during a scanning session as the echo signals are received by receiver 108 and transmitted to processor 116. For the purposes of this disclosure, the term "real-time" is defined to include a procedure that is performed without any intentional delay. For example, an embodiment may acquire images at a real-time rate of 7-20 frames/sec. The ultrasound imaging system 100 may acquire 2D data of one or more planes at a significantly faster rate. However, the real-time frame-rate may be dependent on the length of time that it takes to acquire each frame of data for display. Accordingly, when acquiring a relatively large amount of data, the real-time frame-rate may be slower. Thus, some embodiments may have real-time frame-rates that are considerably faster than 20 frames/sec while other embodiments may have real-time frame-rates slower than 7 frames/sec.

The data may be stored temporarily in a buffer (not shown) during a scanning session and processed in less than real-time in a live or off-line operation. Some embodiments may include multiple processors (not shown) to handle the processing tasks that are handled by processor 116 according to the exemplary embodiment described hereinabove. For example, a first processor may be utilized to demodulate and decimate the RF signal while a second processor may be used to further process the data, for example by augmenting the data as described further herein, prior to displaying an image. Other embodiments may use a different arrangement of processors.

The ultrasound imaging system 100 may continuously acquire data at a frame-rate of, for example, 10 Hz to 30 Hz (e.g., 10 to 30 frames per second). Images generated from the data may be refreshed at a similar frame-rate on display device 118. Other embodiments may acquire and display data at different rates. For example, some embodiments may acquire data at a frame-rate of less than 10 Hz or greater than 30 Hz depending on the size of the frame and the intended application. A memory 120 is included for storing processed frames of acquired data. In an exemplary embodiment, the memory 120 is of sufficient capacity to store at least several seconds' worth of frames of ultrasound data. The frames of data are stored in a manner to facilitate retrieval thereof according to its order or time of acquisition. The memory 120 may include any known data storage medium.

In various embodiments, data may be processed in different mode-related modules by the processor 116 (e.g., B-mode, Color Doppler, M-mode, Color M-mode, spectral Doppler, Elastography, TVI, strain, strain rate, and the like) to form 2D or 3D data. For example, one or more modules may generate B-mode, color Doppler, M-mode, color M-mode, spectral Doppler, Elastography, TVI, strain, strain rate, and combinations thereof, and the like. As one example, the one or more modules may process color Doppler data, which may include traditional color flow Doppler, power Doppler, HD flow, and the like. The image lines and/or frames are stored in memory and may include timing information indicating a time at which the image lines and/or frames were stored in memory. The modules may include, for example, a scan conversion module to perform scan conversion operations to convert the acquired images from beam space coordinates to display space coordinates. A video processor module may be provided that reads the acquired images from a memory and displays an image in real time while a procedure (e.g., ultrasound imaging) is being performed on a patient. The video processor module may include a separate image memory, and the ultrasound images may be written to the image memory in order to be read and displayed by display device 118.

In various embodiments of the present disclosure, one or more components of ultrasound imaging system 100 may be included in a portable, handheld ultrasound imaging device. For example, display device 118 and user interface 115 may be integrated into an exterior surface of the handheld ultrasound imaging device, which may further contain processor 116 and memory 120. Probe 106 may be, as one example, a handheld probe in electronic communication with the handheld ultrasound imaging device to collect raw ultrasound data. Transmit beamformer 101, transmitter 102, receiver 108, and receive beamformer 110 may be included in the same or different portions of the ultrasound imaging system 100. For example, transmit beamformer 101, transmitter 102, receiver 108, and receive beamformer 110 may be included in the handheld ultrasound imaging device, the probe, and combinations thereof.

After performing a two-dimensional ultrasound scan, a block of data comprising scan lines and their samples is generated. After back-end filters are applied, a process known as scan conversion is performed to transform the two-dimensional data block into a displayable bitmap image with additional scan information such as depths, angles of each scan line, and so on. During scan conversion, an interpolation technique is applied to fill missing holes (e.g., pixels) in the resulting image. These missing pixels occur because each element of the two-dimensional block typically covers many pixels in the resulting image. For example, in current ultrasound imaging systems, a bicubic interpolation is applied which leverages neighboring elements of the two-dimensional block. As a result, if the two-dimensional block is relatively small in comparison to the size of the bitmap image, the scan-converted image will include areas of poor or low resolution, especially for areas of greater depth.

Currently, ultrasound probes (such as the ultrasound probe 106 of FIG. 1) may be used in conjunction with endoscopes to perform an endoscopic ultrasound procedure. A conventional system for an endoscopic ultrasound examination may utilize an ultrasound probe fixedly coupled, e.g., not configured to be easily detached by an operator, to an endoscope, demanding post-procedure treatment (disposal or sterilization) to be applied to both the ultrasound probe and the endoscope. Additionally, coupling of the ultrasound probe may be constrained to specific dimensions of one type of endoscope. By, instead, providing a coupling device, e.g., a bracket, that removably couples the ultrasound probe to the endoscope, the ultrasound probe may undergo post-procedure treatment independent of the endoscope. Furthermore, the coupling device may be adaptable to variety of endoscope dimensions and types.

Turning now to FIGS. 2A-2C, views of a combined ultrasound/endoscopic system 203 including an ultrasound assembly 206 removably coupled to an endoscope 202, are shown. FIG. 2A shows a perspective view 200 of the ultrasound/endoscopic system 203. A front view 230 and a side view 260 of the ultrasound/endoscopic system 203 are shown in FIGS. 2B and 2C, respectively. A set of reference axes 201 is provided for comparison between views shown in FIGS. 2A-2C, FIGS. 4A-4C, FIG. 5, FIGS. 6A-6C, and FIG. 7, including an x-axis, a y-axis, and a z-axis. In one example, endoscope 202 may be a transvaginal endoscope, e.g., a hysteroscope, and ultrasound/endoscopic system 203 may be an ultrasound-guided hysteroscope assembly. However, the removable coupling of the ultrasound assembly, as described herein, to other types of endoscopes and medical devices has been considered.

Endoscope 202 may include an arm 204 which extends along the z-axis perpendicular to a handle 207. Arm 204 may be a hollow cylindrical tube attached at a first end 222 to handle 207. A second end 224 of arm 204 (opposite first end 222 along the z-axis) may include an angled tip in which an imaging device, such as a camera, may be located. Ultrasound assembly 206 may include an ultrasound probe 208 integrated with coupling bracket 210 such that the ultrasound probe 208 is not removable from coupling bracket 210 and/or ultrasound probe 208 and coupling bracket 210 are disposed of together.

Coupling bracket 210 may removably couple ultrasound probe 208 to arm 204 and may be configured to maintain a position of ultrasound probe 208 along arm 204. Furthermore, coupling bracket 210 may be selectively positioned, e.g., a user may slidably adjust a position of coupling bracket 210 along arm 204 of endoscope 202, thereby concurrently varying a position of ultrasound probe 208 along arm 204. As such, coupling bracket 210 may be repositionable and translatable, while also being locked in place, e.g., in a position along arm 204 desired by the user, by engaging a clamping mechanism, as described further below. In one example, coupling bracket 210 may be symmetrical about the x-axis but not about the y- or z-axes and may include only curved surfaces. In one embodiment, as described further below, coupling bracket 210 and ultrasound probe 208 may be a single, continuous unit. In alternate embodiments, as described further below with respect to FIGS. 4A-4C and 6A-6C, the coupling bracket 210 may be removably coupled to the ultrasound probe.

Coupling bracket 210 may extend away from the ultrasound probe 208 in a direction perpendicular to a longitudinal axis 205 of arm 204. Line 216 may delineate coupling bracket 210 from ultrasound probe 208. Ultrasound probe 208 may have a length 220 that extends parallel with longitudinal axis 205.

Ultrasound probe 208 may have an elongate section 209 that extends substantially parallel with longitudinal axis 205 between coupling bracket 210 and handle 207 of endoscope 202. The elongate section 209 may, in one example, be coupled to a disposable part 212a of a cable 212, as shown in FIGS. 2A and 2C.

Ultrasound probe 208 may further include a transducer-interfacing section 211, which is continuous with the elongate section 209. The transducer-interfacing section 211 may extend along longitudinal axis 205, between coupling bracket 210 and second end 224 of arm 204 of endoscope 202. However, the transducer-interfacing section 211 is not aligned parallel with longitudinal axis 205. Instead, as shown in FIG. 2C, the transducer-interfacing section 211 may slant downwards, e.g., along the x-axis, as the transducer-interfacing section 211 extends away from coupling bracket 210, at an angle such as 45 degrees. As such, ultrasound probe 208 is held at a distance 238, as shown in FIG. 2B, from a radial center of arm 204 along the x-axis by the transducer-interfacing section 211. The distance 238 may be within, e.g., equal to or less than, a threshold distance that is a target proximity to maintain a field of view of ultrasound probe 208 overlapping with a field of view of the imaging device of endoscope 202. Coupling bracket 210 may therefore position ultrasound probe 208 as close as possible to arm 204 of endoscope 202 without bringing ultrasound probe 208 in direct contact with arm 204 of endoscope 202. A radial footprint of the ultrasound/endoscopic system 203 is thereby minimized.

Coupling bracket 210 may extend a length 218 along the z-axis which may be less than length 220 of ultrasound probe 208. An inner surface 244 of coupling bracket 210 may be configured to fit around second end 224 of arm 204. As discussed further below with respect to FIG. 2B, coupling bracket 210 may include a modular component that directly interfaces with arm 204, allowing coupling bracket 210 to be coupled to hysteroscope arms, such as arm 204, with different diameters. Interfacing components may be considered to be in physical, face sharing contact.

Coupling bracket 210 may be integrated with ultrasound probe 208 such that ultrasound probe 208 extends further along the z-axis in both the positive and negative z-directions than coupling bracket 210. In one embodiment, coupling bracket 210 may hold transducer-interfacing section 211 between coupling bracket 210 and second end 224 of arm 204 along the z-axis.

Coupling bracket 210 may be formed of a biocompatible plastic. In one example, a disposable coupling bracket 210 may be formed of medical grade polyvinylchloride (PVC), polyetherketone (PEEK), polysulfone (PS), polyphenylsulfone (PPSU) and/or polyethersulfone (PES). In other examples, a reusable (e.g., non-disposable) coupling bracket 210 may be formed of a biocompatible metal such as stainless steel or titanium.

A transducer array of ultrasound probe 208 may be positioned to provide an image aligned with longitudinal axis 205 of endoscope 202 (e.g., along the z-axis). Ultrasound probe 208 may include a microconvex transducer including a one-dimensional array of piezoelectric elements, as an example. In one example, ultrasound probe 208 may include 192 piezoelectric elements. In other examples, ultrasound probe 208 may include 128 piezoelectric elements or 112 piezoelectric elements. The number of piezoelectric elements may be chosen based on clinical application and desired physical characteristics of ultrasound probe 208 (e.g., size and/or weight). A radius of curvature of ultrasound probe 208 may be 5 mm-10 mm, for example. In some examples, an outer surface of ultrasound probe 208 may be covered by a coating formed of a biocompatible silicone rubber. Ultrasound assembly (including ultrasound probe 208) may be disposable.

Ultrasound assembly 206 may be communicatively coupled to additional components of an ultrasound system including a processor, such as the processor 116 of FIG. 1, via an ultrasound cable such as cable 212. Cable 212 may be divided into disposable part 212a and a reusable part 212b, the two parts coupled by a connector 214. In one example, the connector 214 may be an umbilical connector. Disposable part 212a may be coupled to ultrasound probe 208. A length of disposable part 212a may be long enough to ensure that only disposable part 212a is inside a patient during a procedure. For example, disposable part 212a may be at least as long as arm 204 along the z-axis. Disposable part 212a may be removably coupled to arm 204 via one or more cable retaining fasteners 213, as shown in FIGS. 2A and 2C. The cable retaining fasteners may hold disposable part 212a of cable 212 along arm 204 in such a way to minimize gaps between disposable part 212a and endoscope 202 and reduce dangling of disposable part 212a from arm 204.

Connector 214 may include a disposable portion 214a coupled to disposable part 212a of cable 212 and a reusable portion 214b coupled to reusable part 212b of cable 212. Disposable part 212a of cable 212 may be a portion of cable 212 that is inserted into a patient or subject, e.g., used internally, while reusable part 212b may remain external to the patient. Connector 214 may be a connector configured to be used with medical catheters or endoscopic devices, such as an umbilical connector.

FIG. 2B shows the front view 230 of the ultrasound/endoscopic system 203. The front view 230 is along the z-axis, looking down arm 204 of endoscope 202, showing coupling bracket 210 and ultrasound probe 208, with ultrasound probe 208 positioned below coupling bracket 210 with respect to the x-axis. Coupling bracket 210 may include an insert or inner bracket 232 arranged in a circular opening 242 of a ring-shaped portion of coupling bracket 210, between the inner surface 244 of coupling bracket 210 and an outer surface of arm 204. In other words, inner bracket 232 may be an interfacing component, interfacing with arm 204 of endoscope 202 and circumferentially surrounding arm 204 such that inner bracket 232 is in direct contact with arm 204.

Inner bracket 232 may be a removable insert formed of a material with different physical properties than coupling bracket 210. For example, the material of inner bracket 232 may be more flexible, deformable, and/or elastic than the material of coupling bracket 210. In one example, inner bracket 232 may operate similar to a gasket and may be shaped as a sleeve that continuously encircles arm 204 of endoscope 202, along a portion of a length of arm 204 of endoscope 202 (where the length is defined along the z-axis). Inner bracket 232 may, in turn, be continuously encircled, e.g., circumferentially surrounded, by coupling bracket 210 and may exert a radially directed compressive force on arm 204 of endoscope 202, thereby maintaining a selected position of coupling bracket 210 along arm 204. Friction generated between inner bracket 232 and arm 204 may also assist in maintaining the position of coupling bracket 210.

The inner surface 244 of coupling bracket 210 may be coupled to inner bracket 232 so that coupling bracket 210 is not able to rotate round inner bracket 232 (e.g., by a series of interlocking ridges). A length of inner bracket 232 along the z-axis may be substantially equal to the length of coupling bracket 210 along the z-axis (e.g., length 218 of FIG. 2A).

Inner bracket 232 may have a thickness 236 and an inner diameter 234. Inner diameter 234 may be substantially equal to an outer diameter of arm 204 so that inner bracket 232 fits securely over arm 204. Inner bracket 232 may be composed of a different biocompatible material than coupling bracket 210 such as biocompatible rubber or soft plastic material such that the rubber or soft plastic material may provide an amount of friction that may hold coupling bracket 210 in place during a medical procedure (e.g., hysteroscopy) but still allow coupling bracket 210 to move forward and backward along arm 204 (e.g., along the z-axis) as desired by an operator (e.g., clinician) and without degrading arm 204. In one example, elongate section 209 may be accessible to an operator during a procedure and may be grasped to pull or push ultrasound probe 208 and coupling bracket 210 into a desired position.

In some examples, an inner surface 246 of inner bracket 232 may be ridged to further create friction between inner bracket 232 and arm 204 that may hold coupling bracket 210 in place. In one embodiment, inner bracket 232 may include clamping mechanisms to reversibly lock coupling bracket 210, in place. An embodiment of a clamping mechanism is discussed further below with respect to FIGS. 6A-6C.

Coupling bracket 210 may be configured to fit around an arm of a plurality of different endoscopes which may have an outer diameter smaller or larger than that of arm 204. As one example, inner bracket 232 may be a modular component removably coupled to coupling bracket 210. For example, inner bracket 232 may be a removable insert such as a washer, gasket, or O-ring. As described above, rotation of inner bracket 232 around the z-axis may be inhibited due to clamping of inner bracket 232 to arm 204 and friction generated between inner bracket 232 and arm 204. However, inner bracket 232 may be decoupled from coupling bracket 210 and replaced by a different inner bracket, which may have substantially the same outer diameter but a different inner diameter. In this way, inner bracket 232 may be replaced with a different inner bracket having a different thickness and inner diameter to securely fit over an arm of a different endoscope with a different outer diameter than arm 204.

A width of coupling bracket 210 along the y-axis may be defined by arrow 240. Arrow 240 may be both a width along the y-axis of ultrasound probe 208 and a maximum width along the y-axis of coupling bracket 210. The width defined by arrow 240 may be chosen based on a width of the ultrasound probe 208. For example, arrow 240 may be between 3 mm and 20 mm.

FIG. 2C shows the side view 260 of the ultrasound/endoscopic system 203, looking along the y-axis. Lines 262a and 262b indicate boundaries of a field of view 262 of ultrasound assembly 206. The field of view 262 of ultrasound assembly 206 may be positioned to overlap with a field of view of an imaging device, such as a camera, of endoscope 202. In this way, images may be obtained by ultrasound assembly 206 during an endoscopic procedure without demanding adjustment of a position or active alignment of the ultrasound assembly 206 in a vertical direction (e.g., along the x-axis) during the procedure. An angle θ between lines 262a and 262b (e.g., the field of view 262 of ultrasound assembly 206) may be at least 50°. In some examples, the angle θ between lines 262a and 262b may be between 50° and 250°. A larger field of view 262 may result in a larger and heavier ultrasound probe 208 and the field of view 262 may therefore be selected according to a use-case and desired weight of ultrasound probe 208. In some examples angle θ may be smaller than 90°. For example, angle θ may be 85°.

Figure 4A:
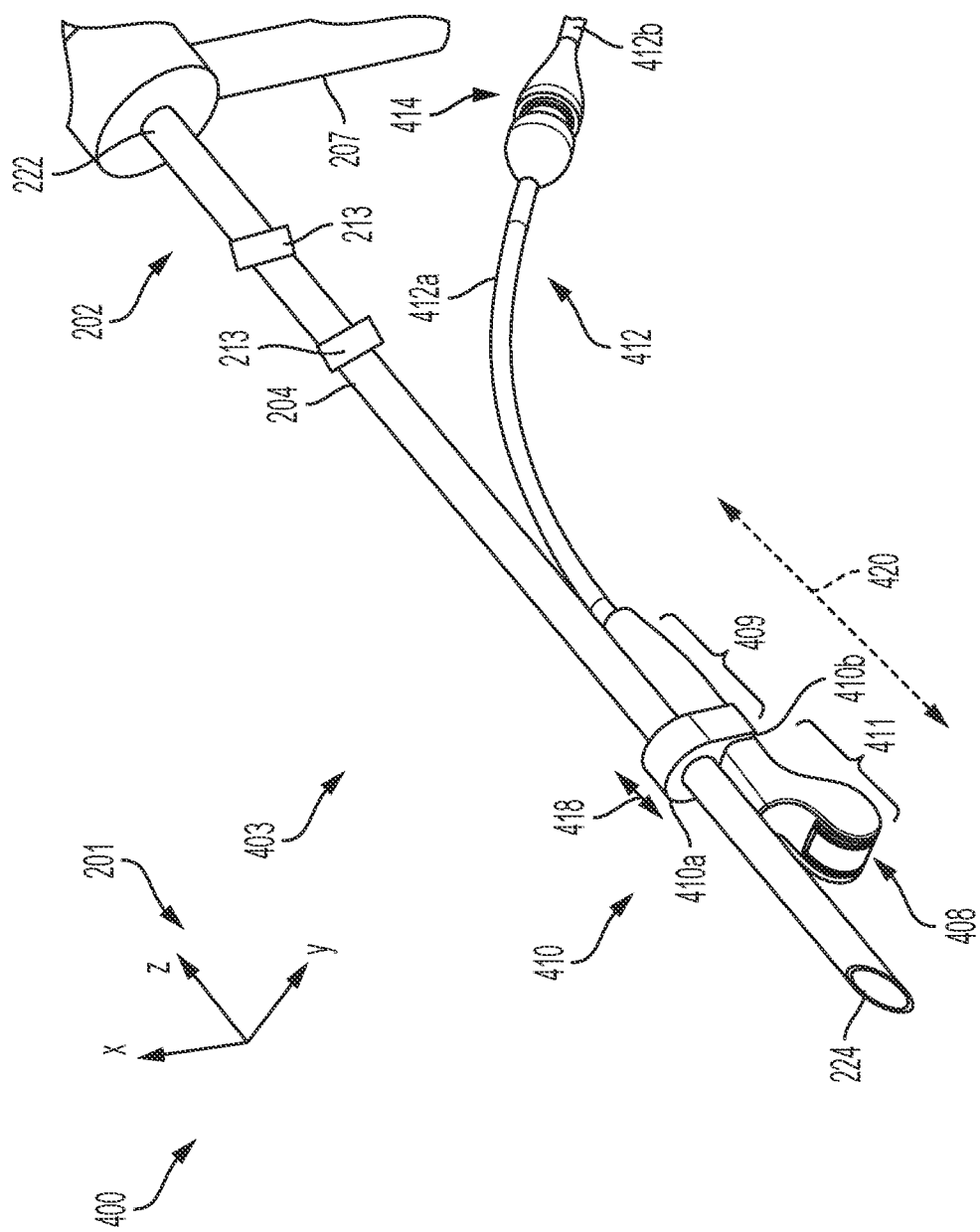
FIG. 4A shows an example of a first alternate embodiment of the disposable ultrasound assembly and endoscope of FIG. 2A.
Figure 4B:
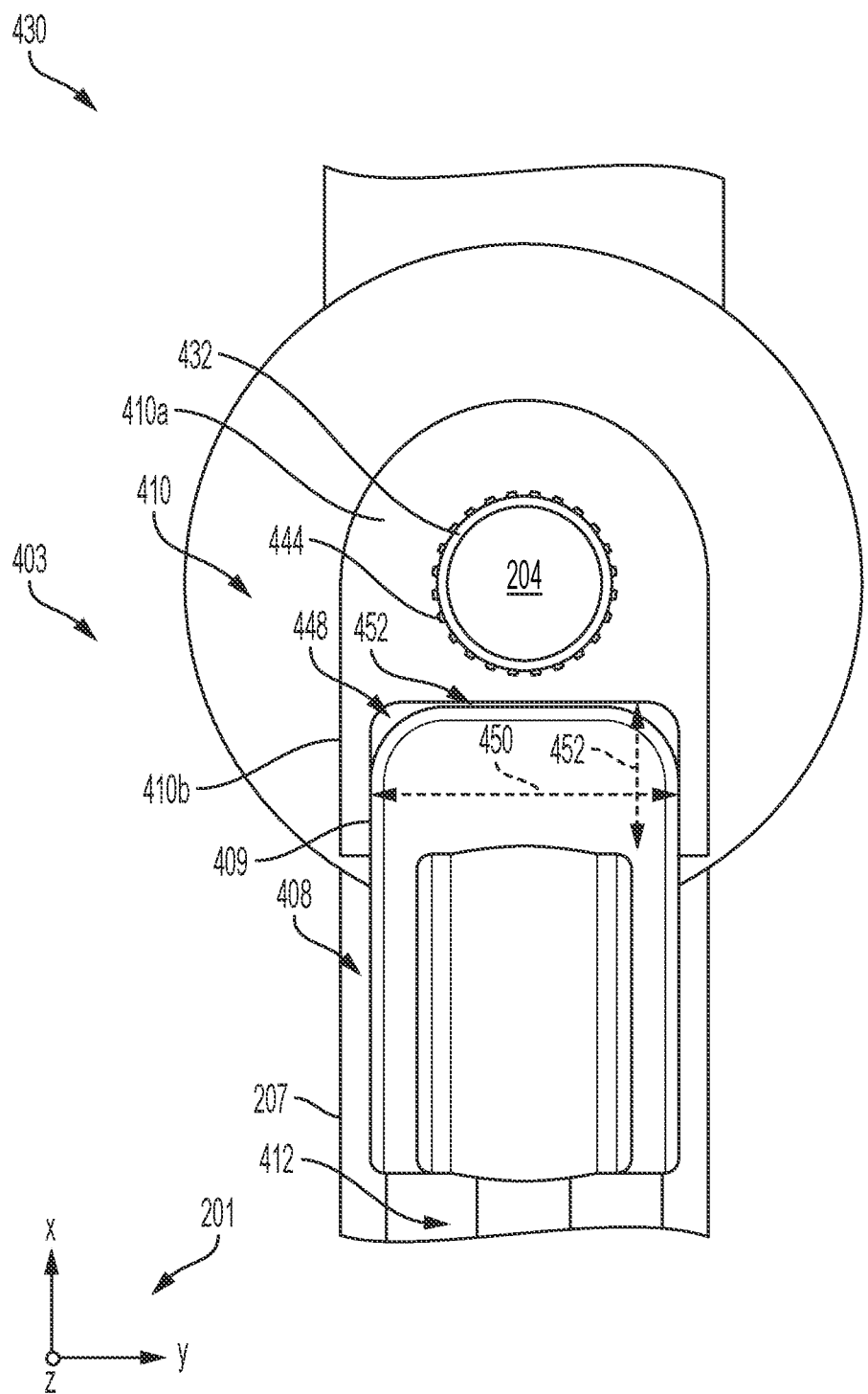
FIG. 4B shows a first alternate view of the first alternate embodiment of the disposable ultrasound assembly and endoscope of FIG. 2A.
Figure 4C:
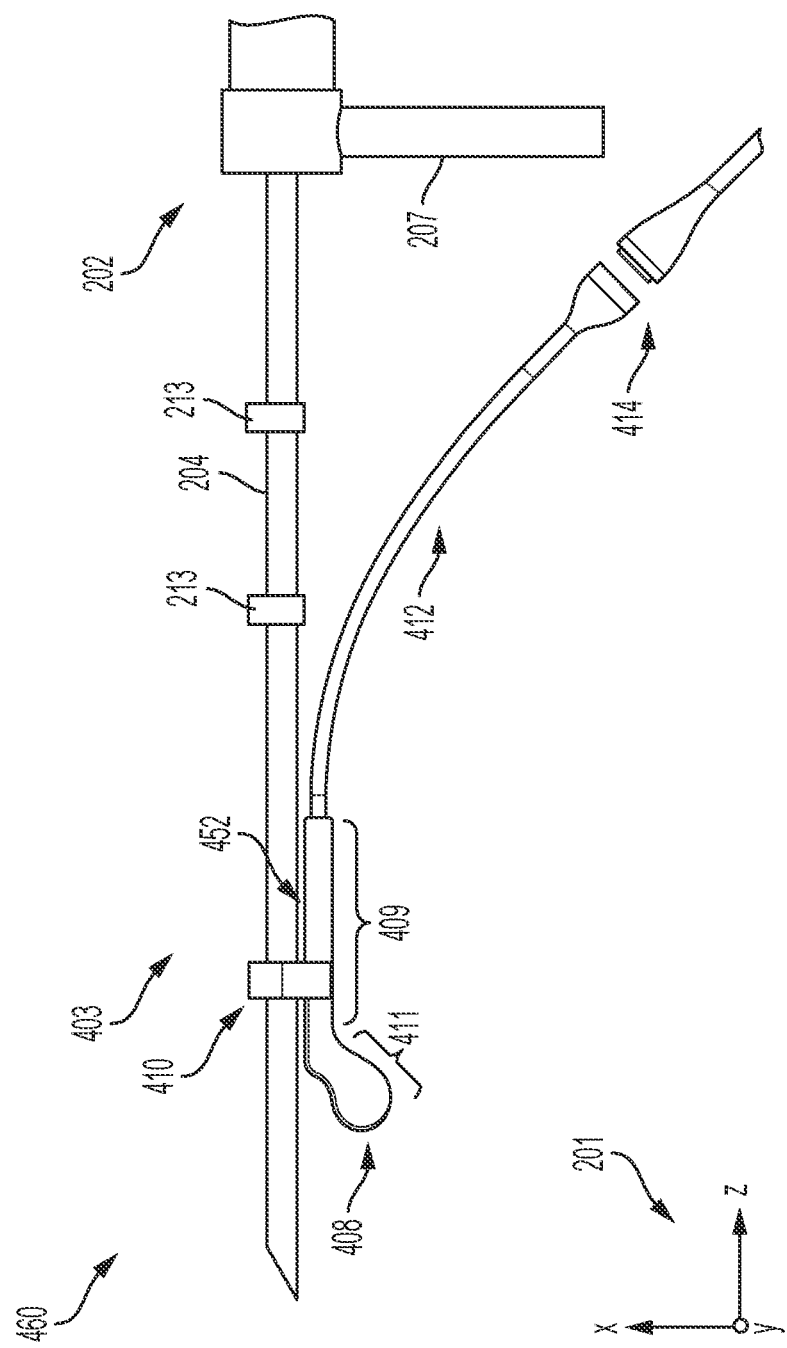
FIG. 4C shows a second alternate view of the first alternate embodiment of the disposable ultrasound assembly and endoscope FIG. 2A.
Figure 5:
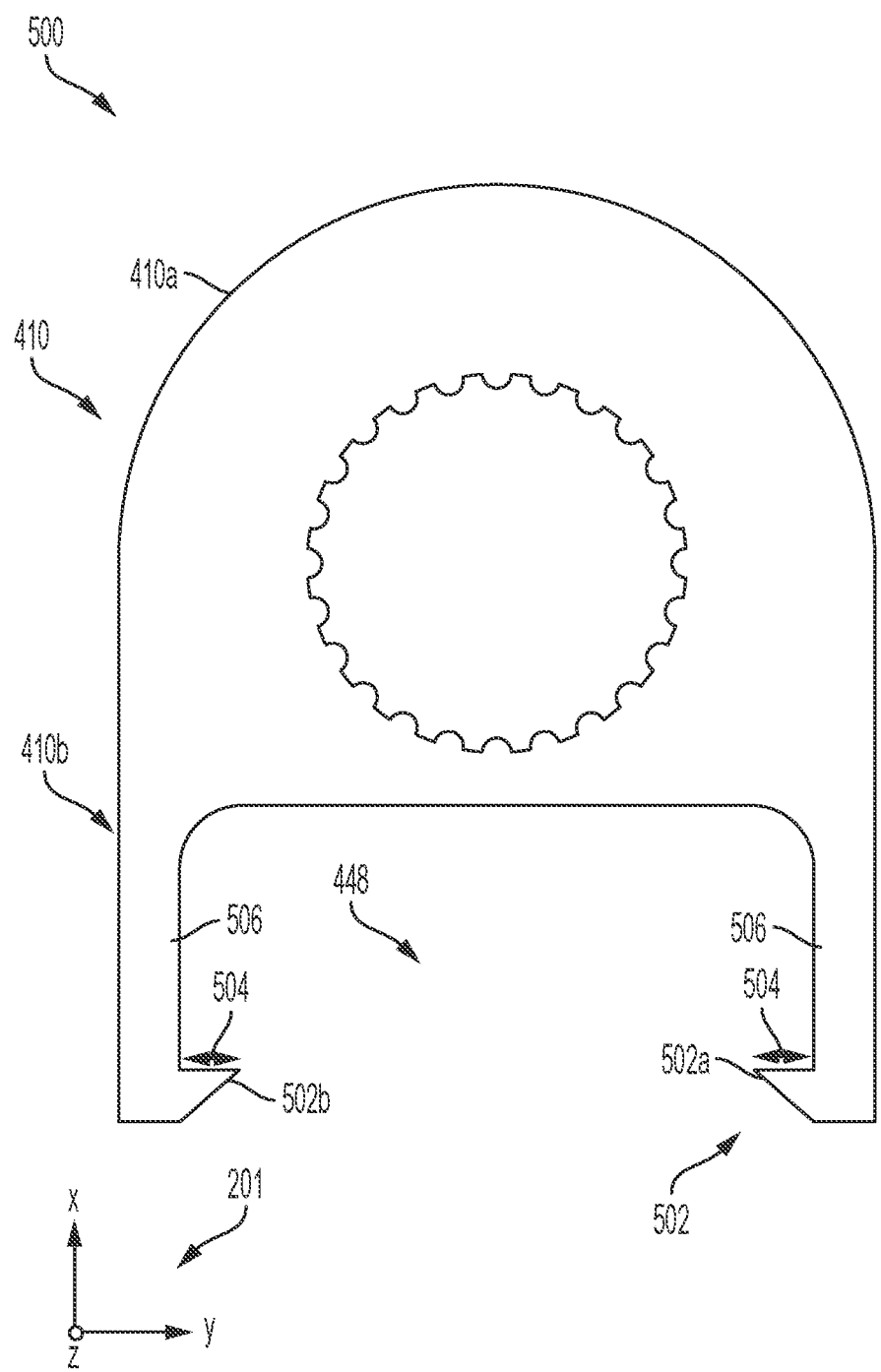
FIG. 5 shows an example of an embodiment of a coupling bracket.
Figure 6A:
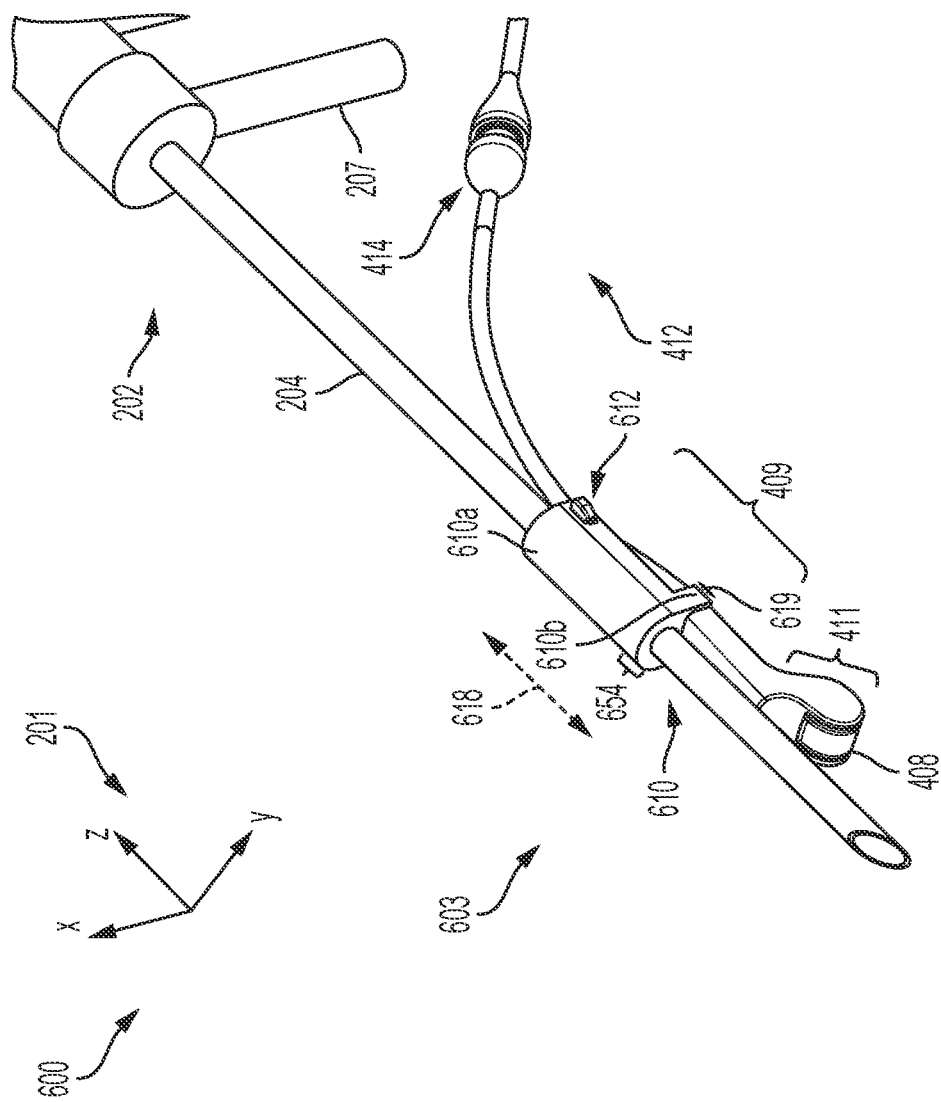
FIG. 6A shows an example of a second alternate embodiment of the disposable ultrasound assembly and endoscope of FIG. 2A.
Figure 6B:
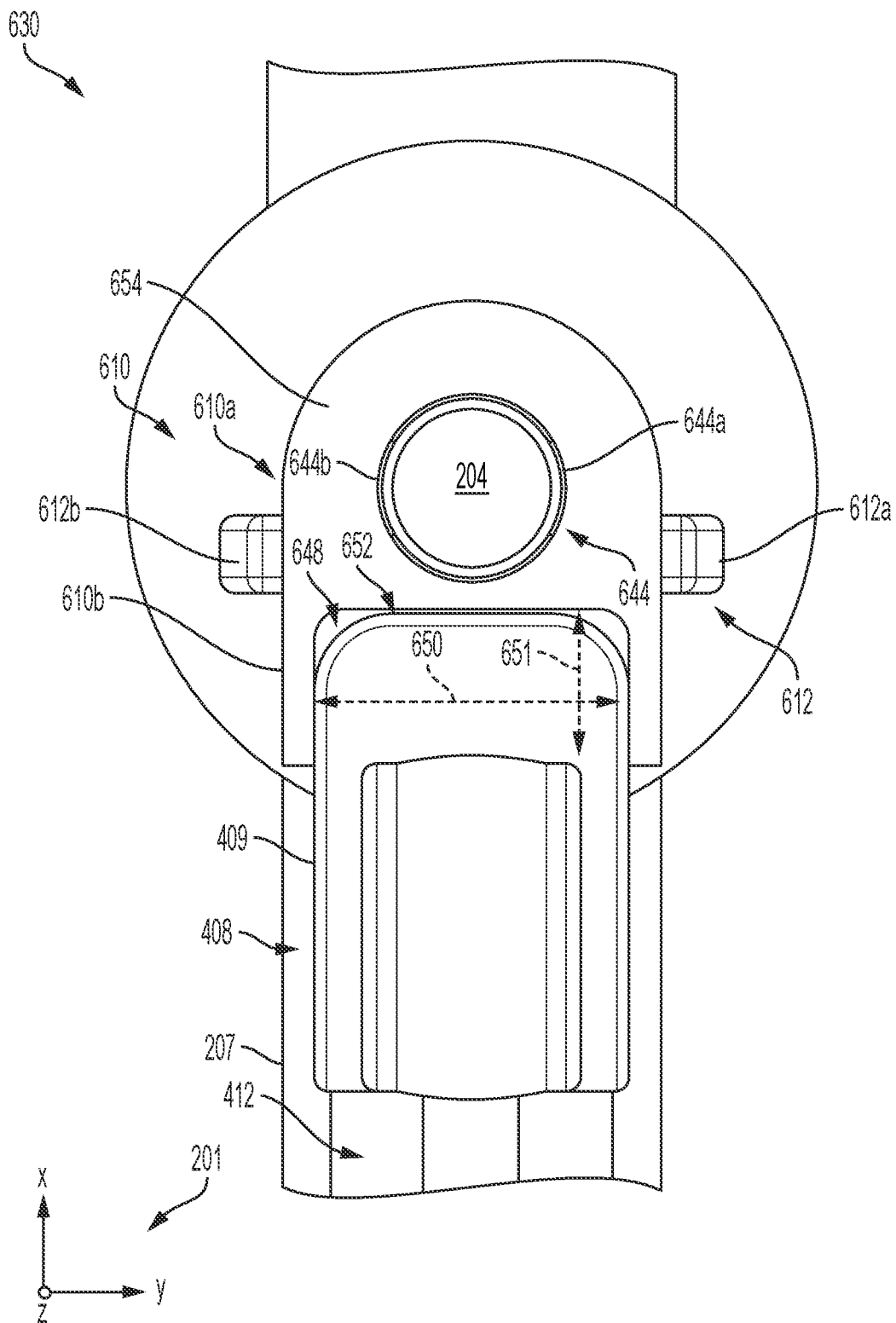
FIG. 6B shows a first alternate view of the second alternate embodiment of the disposable ultrasound assembly and endoscope of FIG. 2A.
Figure 6C:
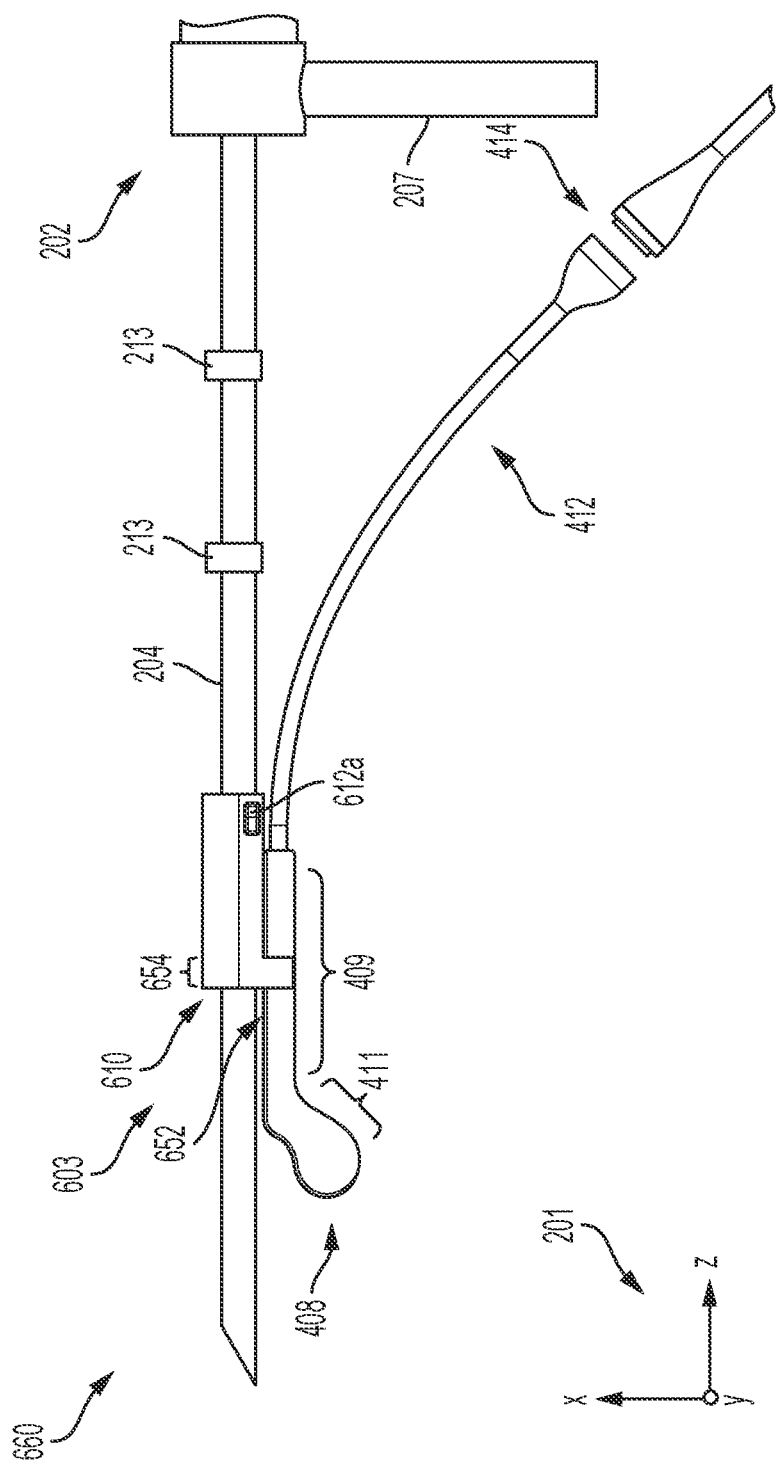
FIG. 6C shows a second alternate view of the second alternate embodiment of the disposable ultrasound assembly and endoscope of FIG. 2A.

Turning now to FIGS. 4A-4C and FIGS. 6A-6C, alternate embodiments of the coupling bracket are shown. FIG. 4A shows a perspective view 400 of a first alternate embodiment of an ultrasound/endoscopic system 403. A front view 430 and a side view 460 of ultrasound/endoscopic system 403 are shown in FIG. 4B and FIG. 4C, respectively. FIG. 6A shows a perspective view 600 of a second alternate embodiment of an ultrasound/endoscopic system 603. A front view 630 and a side view 660 of ultrasound/endoscopic system 603 are shown in FIG. 6B and FIG. 6C, respectively. Ultrasound/endoscopic system 403 and ultrasound/endoscopic system 603 may each include endoscope 202 of FIGS. 2A-2C and therefore components of endoscope 202 are labeled similarly and will not be reintroduced.

Ultrasound/endoscopic system 403 of FIGS. 4A-4C may include endoscope 202, a coupling bracket 410, and an ultrasound probe 408, which may be a reusable ultrasound probe. Coupling bracket 410 may removably couple ultrasound probe 408 to endoscope 202 and may include a ring-shaped portion 410a (herein referred to as ring portion 410a) and a clip portion 410b. It will be appreciated that while discussion of an ultrasound probe coupled to endoscope 202 in FIGS. 4A-4C is directed to ultrasound probe 408, in other examples, a disposable or limited-use ultrasound probe may instead be coupled to endoscope 202 using coupling bracket 410.

Similar to coupling bracket 210 of FIGS. 2A-2C, coupling bracket 410 may be symmetric about the x-axis, but not about the y-axis or z-axis. Coupling bracket 410 may extend a length 418 along the z-axis. Length 418 may be less than a length 420 of ultrasound probe 408. Further, coupling bracket 410 may be formed of a biocompatible plastic similar to coupling bracket 210. Coupling bracket 410 includes a ring portion 410a and clip portion 410b.

Ring portion 410a may removably couple to arm 204 of endoscope 202. Ring portion 410a may be shaped as a ring, fitting around a circumference of arm 204 similar to coupling bracket 210. In addition, also similar to coupling bracket 210, ring portion 410a may include a modular component allowing ring portion 410a to be adjusted to fit an arm 204 of a different diameter.

Clip portion 410b may extend continuously from the left and right sides (from the perspective along the z-axis) downward from ring portion 410a along the x-axis. Clip portion 410b may removably couple ultrasound probe 408 to coupling bracket 410 and thereby removably couple ultrasound probe 408 to arm 204.

Ultrasound probe 408 may be shaped similar to ultrasound probe 208. As such ultrasound probe 408 may include an elongate portion 409 and a transducer-interfacing portion 411. Transducers of ultrasound probe 408 may also be similar in configuration to transducers of ultrasound probe 208, as discussed above with respect to FIG. 2A. Clip portion 410b may removably couple to elongate portion 411 of ultrasound probe 408. Further, clip portion 410b may be configured to maintain a position of ultrasound probe 408 relative to arm 204, as described above with respect to ultrasound probe 208 of FIG. 2B, during a procedure.

All surfaces of ultrasound probe 408 may be covered by a sheath (as shown in FIG. 8). The sheath may be a disposable or reusable (e.g., sterilizable) material. Configurations of the sheath may be discussed further with respect to FIG. 8 below. In this way, surfaces of ultrasound probe 408 do not contact a patient during a procedure. As a result, ultrasound probe 408 may be reused without demanding sterilization.

Ultrasound probe 408 may be coupled to additional components of an ultrasound system including a processor, such as the processor 116 of FIG. 1, via a cable 412. In one example, cable 412 may be similar to cable 212 of FIGS. 2A-2C and may be similarly divided into two parts, e.g., a first part 412a and a second part 412b, which may be coupled by a connector 414 resembling connector 214 of FIGS. 2A-2C. Unlike cable 212 and connector 214, cable 412 and connector 414 may be entirely reusable as a result of being coupled to a reusable ultrasound probe. In an alternate embodiment, cable 412 may be an undivided cable (e.g., not including connector 414) which may be reused along with ultrasound probe 408 to which it is coupled.

FIG. 4B shows the front view 430 of ultrasound/endoscopic system 403. The front view 430 depicts ultrasound/endoscopic system 403 from a perspective along the z-axis, looking down arm 204 of endoscope 202. Similar to coupling bracket 210, ring portion 410a of coupling bracket 410 may include an inner bracket 432 arranged in a circular opening of ring portion 410a, positioned between an inner surface 444 of first ring portion 410a and an outer surface of arm 204. Inner bracket 432 may be similarly configured as inner bracket 232 of FIG. 2B.

Ultrasound probe 408 may mechanically couple to coupling bracket 410 via clip portion 410b in a removable manner. For example, ultrasound probe 408 may fit inside a cavity 448 of clip portion 410b. A width 450 of cavity 448 along the y-axis may be similar to a width of ultrasound probe 408. A height along the x-axis of cavity 448 may be longer than a height of elongate portion 409. In this way, clip portion 410b may include a portion (as shown in FIG. 5) that wraps under a bottom of elongate portion 409 to maintain elongate portion 409 within cavity 448 and proximate to arm 204. Additionally, there may be a gap 452 between a top of elongate portion 409 and a wall of cavity 448. A shape of coupling bracket 410 is discussed further below with respect to FIG. 5. A geometry of cavity 448 may be different from an outer geometry of elongate portion 409 (when viewed along the z-axis) of ultrasound probe 408.

FIG. 4C shows the side view 460 of ultrasound/endoscopic system 403. Similar to ultrasound/endoscopic system 203 of FIGS. 2A-2C, a field of view of ultrasound probe 408 may overlap with a field of view of an imaging device of endoscope 202. An overlap of the field of views between ultrasound probe 408 and the imaging device may be dependent on a magnitude (e.g., distance) of gap 452. A larger gap may result in less overlap of the fields of view of the imaging device and reusable ultrasound probe 408, whereas a smaller gap may result in a larger overlap. Gap 452 may be selected based on a target proximity of ultrasound probe 408 to clip portion 410b.

Turning now to FIG. 5, a front view 500 is shown of coupling bracket 410, separate from ultrasound probe 408, inner bracket 432, and endoscope 202. Clip portion 410b may include clips 502. Clips 502 may be arranged along walls 506 of clip portion 410b and may be configured to removably fasten ultrasound probe 408 to clip portion 410b. In one example, clips 502 may include a first clip 502a and a second clip 502b arranged at bottoms of walls 506 of clip portion 410b as shown in FIG. 5. Greater or fewer clips 502 may be included in clip portion 410b without departing from the scope of this disclosure. Clips 502 may each extend a maximum length 504 across a bottom of cavity 448 along the y-axis, extending toward one another but spaced away from one another. Clips 502 may be formed as teeth that may grip ultrasound probe 408, holding ultrasound probe 408 within cavity 448 without piercing the sheath which may surround ultrasound probe 408. In one example, clips 502 may be shaped as right triangular prisms, positioned so that a side of the triangular prism lies parallel to the y-axis, however other shapes have been considered. Elongate portion 409 of ultrasound probe 408 may be inserted into cavity 448 and a bottom of elongate portion 409 may rest on or be held by clips 502. In this way, ultrasound probe 408 may be removably coupled to coupling bracket 410. In other words, ultrasound probe 408 may be inserted into cavity 448 and held in place during operation of ultrasound/endoscopic system 403 and readily detached from endoscope 202 when desired.

Turning now to FIG. 6A, a perspective view 600 of ultrasound/endoscopic system 603 is shown. Ultrasound/endoscopic system 603 may include endoscope 202 of FIGS. 2A-4C, ultrasound probe 408 of FIGS. 4A-4C, and other components that are discussed with respect to FIGS. 2A-4C. Such components are labeled similarly and will not be reintroduced.

Ultrasound/endoscopic system 603 may include endoscope 202, a coupling bracket 610, and ultrasound probe 408, which may be a reusable ultrasound probe, in one example. It will be appreciated that in other examples, ultrasound/endoscopic system 603 may instead include a disposable or limited-use ultrasound probe. Coupling bracket 610 may removably couple ultrasound probe 408 to endoscope 202 and may include a ring-shaped portion 610a (herein referred to as ring portion 610a) and a clip portion 610b. Further, coupling bracket 610 may be formed of a biocompatible plastic similar to coupling bracket 210 of FIGS. 2A-2C.

Ring portion 610a may extend a length 618 along the z-axis. Length 618 may be less than the length 420 of ultrasound probe 408, as shown in FIG. 4A. Ring portion 610a may include a circular opening which may surround a circumference of arm 204 of endoscope 202. Ring portion 610a may include a first button 612a and a second button 612b (not visible in this view, but shown in FIG. 6B and FIG. 7) located on opposite sides of ring portion 610a at an end of ring portion 610a distal from the transducer-interfacing portion 411 of ultrasound probe 408. Buttons 612a and 612b may actuate grippers of ring portion 610a to secure a position of coupling bracket 610 along the z-axis of arm 204 as discussed further below with respect to FIG. 6B and FIG. 7.

Similar to clip portion 410b of FIGS. 4A-4C, clip portion 610b may be continuous with ring portion 610a and extend below second ring portion 610a, with respect to the x-axis. Clip portion 610b may extend a length 619 along the z-axis which may be less than each of length 618 and length 420. Clip portion 610b may removably couple to elongate portion 409 of ultrasound probe 408 and hold ultrasound probe 408 proximate to arm 204.

FIG. 6B shows the front view 630 of ultrasound/endoscopic system 603. The front view 630 depicts ultrasound/endoscopic system 603 from a perspective along the z-axis, looking down arm 204 of endoscope 202. Ring portion 610a is shown in FIG. 6B with a first gripper 644a and a second gripper 644b (collectively referred to as grippers 644). First gripper 644a may be positioned opposite second gripper 644b around a circumference of arm 204. Grippers 644 may be sandwiched between an inner surface of ring portion 610a and the outer surface of arm 204 such that grippers 644 are in face-sharing contact with the outer surface of arm 204, e.g., without spaces or gaps in between. In this way, coupling bracket 610 may be held stationary with respect to endoscope 202 during a procedure. Buttons 612 may actuate grippers 644. When buttons 612 are depressed, grippers 644 may be withdrawn to become flush with and/or recessed into the inner surface of ring portion 610a. As such, grippers 644 may be spaced away from the outer surface of arm 204 and no longer in face-sharing contact. When buttons 612 are released, grippers 644 may be forced (e.g., by action of springs) towards the outer surface of arm 204. A distance with which grippers 644 may protrude beyond the inner surface of ring portion 610a may depend on a distance between the inner surface of ring portion 610a of coupling bracket 610 and the outer surface of the arm 204 of endoscope 202. In this way, grippers 644 may adapt ring portion 610a to fit different endoscopes having arms of different diameters. Further, depressing buttons 612 may allow free movement of coupling bracket 610 along the z-axis (e.g., along arm 204), thereby allowing an operator to adjust a position of coupling bracket 610 during a procedure.

Clip portion 610b may have a region 654 shaped similarly to clip portion 410b of FIGS. 4A-4B. As such, clip portion 610b includes a cavity 648 in which elongate portion 409 of ultrasound probe 408 may be inserted. Cavity 648 may extend a width 650 along y-axis, similar to the width of elongate portion 409. Further, cavity 648 may extend a height 651 along the x-axis, which may be similar to the length along the x-axis of clip portion 610b.

FIG. 6C shows the side view 660 of ultrasound/endoscopic system 603. Similar to ultrasound/endoscopic system 203 of FIGS. 2A-2C, a field of view of ultrasound probe 408 may overlap with a field of view of an imaging device of endoscope 202. An overlap of the field of views between ultrasound probe 408 and the imaging device may be dependent on a magnitude (e.g., distance) of gap 652. A larger gap may result in less overlap of the fields of view of the imaging device and reusable ultrasound probe 408, whereas a smaller gap may result in a larger overlap.

Turning now to FIG. 7, a front view 700 is shown of disposable coupling bracket 610, separate from ultrasound probe 408, and endoscope 202. Clip portion 610b may include clips 702. Clips 702 may be arranged along walls 706 of clip portion 610b and may be configured to removably fasten ultrasound probe 408 to clip portion 610b. In one example, clips 702 may include a first clip 702a and a second clip 702b arranged at bottoms of walls 706 of clip portion 610b as shown in FIG. 7. Greater or fewer clips 702 may be included in clip portion 610b without departing from the scope of this disclosure. Clips 702 may each extend a maximum length 704 across a bottom of cavity 648 along the y-axis, extending toward one another but spaced away from one another. Clips 702 may be formed as teeth that may grip ultrasound probe 408, holding ultrasound probe 408 within cavity 648 without piercing the sheath which may surround ultrasound probe 408. In one example, clips 702 may be shaped as right triangular prisms, positioned so that a side of the triangular prism lies parallel to the y axis, however other shapes have been considered. Clip portion 610b may function similarly to clip portion 410b to secure disposable ultrasound 408 within cavity 648.

Additionally, front view 700 shows grippers 644 of ring portion 610 at a fully extended position. In one example, grippers 644 may be shaped as rectangular prisms. Grippers 644 may be formed of a flexible biocompatible material such that grippers 644 may deform to be in face sharing contact with arm 204. When fully extended, a distance 712 may separate the grippers 644 along the y-axis. Distance 712 may be long enough that ring portion 610a may be held securely around any endoscope arm.

As discussed above with respect to FIG. 6B, buttons 612 may be depressed along the y-axis. Arrows 708a and 708b show the direction in which buttons 612a and 612b respectively are depressed. At the same time, grippers 644a and 644b may move along the y-axis in opposite directions, e.g., as indicated by arrow 710a and 710b respectively. In this way, depressing buttons 612 may allow ultrasound probe 408 to move freely along or rotate around arm 204 (e.g., the z-axis).

FIG. 8 shows an example 800 of an ultrasound probe 804 and a protective sheath 802, where, in one example, ultrasound probe 804 may be a reusable ultrasound probe. Protective sheath 802 may be formed of a flexible biocompatible material sized so that protective sheath 802 may be in face sharing contact with ultrasound probe 804 when ultrasound probe 804 is disposed within protective sheath 802. When ultrasound probe 804 sits inside protective sheath 802, protective sheath 802 may provide a barrier between ultrasound probe 804 and a patient. Cable 806 may couple to an end of ultrasound probe 804 not inserted into the patient, e.g., remains external to the patient and may not be covered by protective sheath 802.

Turning now to FIG. 3, an example of a method 300 is shown for using an invasive imaging assembly, such as ultrasound/endoscopic system 203 of FIGS. 2A-2C, ultrasound/endoscopic system 403 of FIGS. 4A-4C, or ultrasound/endoscopic system 603 of FIGS. 6A-6C. The imaging assembly may include a disposable portion, such as an ultrasound probe or transducer of an ultrasound system (such as the ultrasound described with respect to FIG. 1), coupled to an endoscope by a coupling bracket, e.g., coupling bracket 210 of FIGS. 2A-2C, coupling bracket 410 of FIGS. 4A-5, or coupling bracket 610 of FIGS. 6A-7, where the coupling bracket may or may not be integrated, e.g., fixedly coupled, with the ultrasound probe. In some examples, the ultrasound probe may be reusable or may be configured for limited use. At 302, the ultrasound probe is attached to the endoscope. Attaching the ultrasound probe to the endoscope may include attaching a ring portion of the coupling bracket to the endoscope at 304. In some examples, the ultrasound probe may be coupled to the endoscope before the imaging system is inserted into a patient. In other examples, the ultrasound probe may be coupled to the endoscope after the endoscope is inserted into the patient.

For example, an arm of the endoscope may be inserted through an opening of the ring portion of the coupling bracket and the coupling bracket may be positioned at a desired location along a length of the arm. The coupling bracket may be fitted with an inner bracket at the ring portion which is selected to have a diameter substantially equal to an outer diameter of the arm of the endoscope. The coupling bracket is maintained in place along the endoscope arm by implementation of grippers with actuating buttons, as shown by coupling bracket 610, or by friction, as shown by coupling brackets 210 and 410. The ring portion may be configured to be coupled to the ultrasound probe and to hold, e.g., attach to, the probe as described above with respect to FIGS. 4A-4C and 6A-6C.

In examples where the ultrasound probe is fixedly coupled to the coupling bracket, such as coupling bracket 210, coupling of the coupling bracket to the endoscope arm also attaches the ultrasound probe to the endoscope arm. In other examples where the ultrasound probe is not integral with the coupling bracket (such as coupling bracket 410 or coupling bracket 610), the ultrasound probe is attached to the coupling bracket at 306. For example, the ultrasound probe may be inserted into a cavity of a clip portion of the coupling bracket located below the ring portion (e.g., cavity 448 of FIG. 5 and 648 of FIG. 6B-6C) where the ultrasound probe is held in place by clips or supports (e.g., supports 502 of FIG. 5 and 702 of FIG. 7).

At 308, the ultrasound probe, which may be included in the ultrasound/endoscopic system along with the coupling bracket, is connected via a connector (such as connector 214 of FIGS. 2A-2C, 414 of FIGS. 4A-4C and 6A-6C) to other components of an ultrasound system, such as shown in FIG. 1. The connector may connect a first portion of a cable to a second portion of the cable, where the first portion is coupled to the ultrasound probe and the second portion is coupled to the other components. The cable may electrically and communicatively couple the ultrasound probe to the ultrasound system. As described above, the first portion of the cable may be a disposable part fixedly coupled to the ultrasound probe while the second portion of the cable is not disposable. However, in other examples, the first portion may not be disposable. Connecting the ultrasound probe to the ultrasound system may include connecting two portions of the connector, which may be an umbilical connector, as an example.

At 310, an endoscopic procedure is performed. The endoscopic procedure may be a hysteroscopy, in one example. During the endoscopic procedure, the ultrasound probe may be moved along the arm of endoscope as described above with respect to FIGS. 2B and 6B. At 312, the procedure is finished and the method includes disconnecting the ultrasound probe from the ultrasound system. Disconnecting the ultrasound probe may include decoupling the cable that was coupled at 308 by separating the two portions of the connector. The second portion of the cable not attached to the ultrasound probe may be set aside for subsequent procedures.

At 314, the coupling bracket and ultrasound probe of the imaging system may be removed from the endoscope. In one example, removing the coupling bracket from the endoscope may include decoupling the inner ring from the endoscope arm and decoupling the coupling bracket from the ultrasound probe if the two parts are not integral. In another example, removing the coupling bracket may include depressing buttons to retract grippers holding the coupling bracket on the endoscope arm. At 316, method 300 includes determining if any parts of the coupling bracket or the ultrasound probe of the imaging assembly are to be sterilized. For example, one or both of the coupling bracket and the ultrasound probe portion (the ultrasound probe portion including the ultrasound probe and the first portion of the cable) of the imaging assembly may be reusable or configured for limited use (e.g., sterilizable for a threshold number of times before disposal). The ultrasound probe may be reusable if protected by a sheath as described with respect to FIG. 8.

If one or more parts of the ultrasound probe or coupling bracket of the imaging assembly are to be sterilized, the method proceeds to 319 to sterilize the parts that may have directly contacted a patient during the procedure and may be reusable or limited use. If at 316, if the ultrasound probe or the coupling bracket are disposable, method 300 includes disposing of the disposable portions at 318. In some examples, one or both of the coupling bracket and the ultrasound probe may be disposable. In another example, one or both of the coupling bracket and ultrasound probe may be limited use components that have been sterilized up to a threshold number of times and may now be disposed. At 320, the endoscope (now separate from the ultrasound assembly) is sterilized for re-use in a subsequent procedure. Method 300 ends.

In this way, an ultrasound probe may be removably coupled to a medical device to provide guiding images or diagnostic information to a clinician during an invasive medical procedure. The ultrasound probe may be configured to be disposable or reusable independent of the sterilizing the medical device. Further, the ultrasound probe may be removably coupled by a modular bracket allowing for the ultrasound probe to be used across a plurality of medical devices. A cost of providing ultrasound images during an invasive medical procedure may be reduced as a result of the ultrasound probe being used with existing medical devices across a range of sizes and use modes (e.g. disposable or reusable). Furthermore, by coupling the ultrasound probe to, for example, an endoscope to provide an imaging assembly, as described herein, an operator may operate the assembly with one hand, thereby allowing another hand to be free. A workflow while performing an imaging procedure may be more efficient as a result.

FIGS. 2A-2C and 4A-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being coupling, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The technical effect of removably coupling an ultrasound assembly to a medical device is that the ultrasound assembly may be disposed of separate from the preferred disposal or sterilization protocol for the medical device. Removably coupling an ultrasound assembly using a coupling bracket including a removably coupled inner bracket allows the inner bracket to be chosen based on the medical device to which the ultrasound assembly is to be coupled. In this way the ultrasound assembly may be removably coupled to a plurality of different medical devices, including endoscopes.

The disclosure also provides support for an ultrasound-assisted endoscopy system, comprising: a selectively positioned bracket with an opening for receiving an endoscope, and an array of transducer elements of an ultrasound probe, the array of transducer elements aligned with a longitudinal axis of the endoscope, coupled to the endoscope by the selectively positioned bracket, and configured to acquire an image along the longitudinal axis, wherein the array of transducer elements provides a field of view of at least 50 degrees. In a first example of the ultrasound-assisted endoscopy system, the field of view of the array of transducer elements is between 50 degrees and 250 degrees. In a second example of the ultrasound-assisted endoscopy system, optionally including the first example, the selectively positioned bracket has a first portion, the first portion shaped as a ring, that includes the opening, and wherein the first portion circumferentially surrounds an arm of the endoscope. In a third example of the ultrasound-assisted endoscopy system, optionally including one or both of the first and second examples, the selectively positioned bracket has a second portion, the second portion having at least one clip that maintains a position of the ultrasound probe relative to the selectively positioned bracket, and wherein the second portion is continuous with the first portion of the selectively positioned bracket. In a fourth example of the ultrasound-assisted endoscopy system, optionally including one or more of each of the first through third examples, the first portion is continuous with the ultrasound probe. In a fifth example of the ultrasound-assisted endoscopy system, optionally including one or more of each of the first through fourth examples, the field of view of the array of transducer elements overlaps with a field of view of a camera of the endoscope due to a positioning of the ultrasound probe within a target proximity to the endoscope by the selectively positioned bracket. In a sixth example of the ultrasound-assisted endoscopy system, optionally including one or more of each of the first through fifth examples, the endoscope is a hysteroscope. In a seventh example of the ultrasound-assisted endoscopy system, optionally including one or more of each of the first through sixth examples, the array of transducer elements is disposable and removable from the selectively positioned bracket, and wherein the array of transducer elements is coupled to a section of an ultrasound cable that is also disposable. In an eighth example of the ultrasound-assisted endoscopy system, optionally including one or more of each of the first through seventh examples, the section of the ultrasound cable that is also disposable is coupled to an arm of the endoscope along a length of the arm by one or more cable retaining fasteners. In a ninth example of the ultrasound-assisted endoscopy system, optionally including one or more of each of the first through eighth examples, the selectively positioned bracket includes an inner bracket positioned between an arm of the endoscope and inner surfaces of the opening of the selectively positioned bracket, and wherein the inner bracket has an inner diameter similar to an outer diameter of the endoscope and an outer diameter similar to a diameter of the opening of the selectively positioned bracket. In a tenth example of the ultrasound-assisted endoscopy system, optionally including one or more of each of the first through ninth examples, the inner bracket is a removable insert and wherein the inner diameter of the removable insert has a first width, and wherein the removable insert is replaceable by a different removable insert, the different removable insert having an outer diameter similar to the outer diameter of the removable insert and having an inner diameter with a second width, the second width different from the first width.

The disclosure also provides support for an ultrasound-guided hysteroscope assembly, comprising: an imaging device coupled to a hysteroscope of the ultrasound-guided hysteroscope assembly, the imaging device having a first field of view, a disposable ultrasound probe positioned proximate to the ultrasound-guided hysteroscope assembly and having a second field of view, the second field of view overlapping with the first field of view of the imaging device and having an angle of at least 90 degrees, and a translatable coupling bracket attaching the disposable ultrasound probe to the hysteroscope, the translatable coupling bracket fixedly coupled or removably coupled to the disposable ultrasound probe. In a first example of the ultrasound-guided hysteroscope assembly, the translatable coupling bracket is slidable along a length of an arm of the hysteroscope, and wherein the translatable coupling bracket is maintained in place by one or more of friction and a compressive force exerted on the arm by grippers, the grippers actuated and released by buttons. In a second example of the ultrasound-guided hysteroscope assembly, optionally including the first example, the second field of view of the disposable ultrasound probe is at least 150 degrees. In a third example of the ultrasound-guided hysteroscope assembly, optionally including one or both of the first and second examples, the disposable ultrasound probe includes a first, disposable portion of an ultrasound cable, and wherein the first, disposable portion of the ultrasound cable is coupled to a second, non-disposable portion of the ultrasound cable by an umbilical connector. In a fourth example of the ultrasound-guided hysteroscope assembly, optionally including one or more of each of the first through third examples, a removable insert is arranged between a ring-shaped portion of the translatable coupling bracket and the hysteroscope, within an opening of the ring-shaped portion, and wherein the removable insert is shaped according to a geometry and dimensions of an arm of the hysteroscope. In a fifth example of the ultrasound-guided hysteroscope assembly, optionally including one or more of each of the first through fourth examples, the disposable ultrasound probe is a microconvex transducer with a one-dimensional array of transducer elements.

The disclosure also provides support for a repositionable coupling bracket for an ultrasound-assisted endoscopy system, comprising: a first portion configured to interface with an arm of an endoscope, and a second portion attached to the first portion, the second portion having a cavity for receiving an ultrasound probe and at least one clip for maintaining a position of the ultrasound probe within the second portion. In a first example of the system, the repositionable coupling bracket is formed of a first biocompatible and disposable material, and wherein the repositionable coupling bracket includes an interfacing component arranged between the first portion and the arm of the endoscope, the interfacing component formed of a second biocompatible and disposable material that is more deformable than the first biocompatible and disposable material. In a second example of the system, optionally including the first example, the repositionable coupling bracket is removably coupled to each of the endoscope and the ultrasound probe.

As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An ultrasound-assisted endoscopy system, comprising:
    a selectively positioned bracket with an opening for receiving an endoscope, wherein the selectively positioned bracket has a first portion, the first portion shaped as a ring, that includes the opening, and wherein the first portion circumferentially surrounds an arm of the endoscope; and
    an array of transducer elements of an ultrasound probe, the array of transducer elements aligned with a longitudinal axis of the endoscope, coupled to the endoscope by the selectively positioned bracket, and configured to acquire an image along the longitudinal axis;
    wherein the array of transducer elements provides a field of view of at least 50 degrees, wherein the selectively positioned bracket has a second portion, the second portion having at least one clip, that maintains a position of the ultrasound probe relative to the selectively positioned bracket, and wherein the second portion is continuous with the first portion of the selectively positioned bracket.

2. The ultrasound-assisted endoscopy system of claim 1, wherein the field of view of the array of transducer elements is between 50 degrees and 250 degrees.

3. The ultrasound-assisted endoscopy system of claim 1, wherein the field of view of the array of transducer elements overlaps with a field of view of a camera of the endoscope due to a positioning of the ultrasound probe within a target proximity to the endoscope by the selectively positioned bracket.

4. The ultrasound-assisted endoscopy system of claim 1, wherein the endoscope is a hysteroscope.

5. The ultrasound-assisted endoscopy system of claim 1, wherein the array of transducer elements is disposable and removable from the selectively positioned bracket, and wherein the array of transducer elements is coupled to a section of an ultrasound cable that is also disposable.

6. The ultrasound-assisted endoscopy system of claim 5, wherein the section of the ultrasound cable that is also disposable is coupled to the arm of the endoscope along a length of the arm by one or more cable retaining fasteners.

7. The ultrasound-assisted endoscopy system of claim 1, wherein the selectively positioned bracket includes an inner bracket positioned between an arm of the endoscope and inner surfaces of the opening of the selectively positioned bracket, and wherein the inner bracket has an inner diameter similar to an outer diameter of the endoscope and an outer diameter similar to a diameter of the opening of the selectively positioned bracket.

8. The ultrasound-assisted endoscopy system of claim 7, wherein the inner bracket is a removable insert and wherein the inner diameter of the removable insert has a first width, and wherein the removable insert is replaceable by a different removable insert, the different removable insert having an outer diameter similar to the outer diameter of the removable insert and having an inner diameter with a second width, the second width different from the first width.

9. An ultrasound-guided hysteroscope assembly, comprising:
    an imaging device coupled to a hysteroscope of the ultrasound-guided hysteroscope assembly, the imaging device having a first field of view;
    a disposable ultrasound probe positioned proximate to the ultrasound-guided hysteroscope assembly and having a second field of view, the second field of view overlapping with the first field of view of the imaging device and having an angle of at least 90 degrees; and a translatable coupling bracket attaching the disposable ultrasound probe to the hysteroscope, the translatable coupling bracket fixedly coupled or removably coupled to the disposable ultrasound probe, wherein the translatable coupling bracket is slidable along a length of an arm of the hysteroscope, and wherein the translatable coupling bracket is maintained in place by one or more of friction and a compressive force exerted on the arm by grippers, the grippers actuated and released by buttons.

10. The ultrasound-guided hysteroscope assembly of claim 9, wherein the second field of view of the disposable ultrasound probe is at least 150 degrees.

11. The ultrasound-guided hysteroscope assembly of claim 9, wherein the disposable ultrasound probe includes a first, disposable portion of an ultrasound cable, and wherein the first, disposable portion of the ultrasound cable is coupled to a second, non-disposable portion of the ultrasound cable by an umbilical connector.

12. The ultrasound-guided hysteroscope assembly of claim 9, wherein the disposable ultrasound probe is a microconvex transducer with a one-dimensional array of transducer elements.

13. A repositionable coupling bracket for an ultrasound-assisted endoscopy system, comprising:

a first portion configured to interface with an arm of an endoscope; and a second portion attached to the first portion, the second portion having a cavity for receiving an ultrasound probe and at least one clip for maintaining a position of the ultrasound probe within the second portion.

14. The repositionable coupling bracket of claim 13, wherein the repositionable coupling bracket is formed of a first biocompatible and disposable material, and wherein the repositionable coupling bracket includes an interfacing component arranged between the first portion and the arm of the endoscope, the interfacing component formed of a second biocompatible and disposable material that is more deformable than the first biocompatible and disposable material.

15. The repositionable coupling bracket of claim 13, wherein the repositionable coupling bracket is removably coupled to each of the endoscope and the ultrasound probe.

* * * * *